(12) United States Patent
Peele

(10) Patent No.: US 12,352,453 B2
(45) Date of Patent: Jul. 8, 2025

(54) GEOTHERMAL HEAT EXCHANGE RESERVOIRS AND RELATED METHODS AND SYSTEMS

(71) Applicant: Gary Scott Peele, Zebulon, NC (US)

(72) Inventor: Gary Scott Peele, Zebulon, NC (US)

(*) Notice: Subject to any disclaimer, the term of this patent is extended or adjusted under 35 U.S.C. 154(b) by 23 days.

(21) Appl. No.: 17/933,681

(22) Filed: Sep. 20, 2022

(65) Prior Publication Data

US 2024/0093881 A1    Mar. 21, 2024

Related U.S. Application Data

(63) Continuation of application No. 16/547,082, filed on Aug. 21, 2019, now Pat. No. 11,493,238.

(60) Provisional application No. 62/721,938, filed on Aug. 23, 2018.

(51) Int. Cl.
*F24D 3/18*     (2006.01)
*F24T 10/10*    (2018.01)
*F24T 10/00*    (2018.01)

(52) U.S. Cl.
CPC .............. *F24D 3/18* (2013.01); *F24T 10/10* (2018.05); *F24D 2200/11* (2013.01); *F24T 2010/53* (2018.05)

(58) Field of Classification Search
CPC ... F24T 10/10; F24T 2010/53; F24D 2200/11; F24D 3/18
See application file for complete search history.

(56) References Cited

U.S. PATENT DOCUMENTS 2,123,809 A   7/1938  Clinton
2,260,111 A  10/1941  Caldwell
2,294,176 A   8/1942  Gredell
2,732,071 A   1/1956  Crow
3,217,791 A  11/1965  Long
3,280,082 A  10/1966  Giulio et al.
3,472,314 A  10/1969  Balch
3,501,193 A   3/1970  Gray (Continued)

FOREIGN PATENT DOCUMENTS

GB    2247072 A    2/1992

OTHER PUBLICATIONS

Forrest, Andrew Ryan "Optimization of a Geothermal Heat Pump System with Aboveground Water Storage" Thesis, North Carolina State University Department of Mechanical and Aerospace Engineering (102 pages) (May 2003).

*Primary Examiner* — Nael N Babaa
(74) *Attorney, Agent, or Firm* — Myers Bigel, P.A.

(57) ABSTRACT

Trench-confirmable geothermal reservoirs with flexible reservoir bodies that can snugly abut trench walls (that may be of virgin, compacted earth) for facilitating heat exchange and flow liquid from one lower end to an opposing top end, and vice versa, depending on desired heat exchange. The direction can be reversed for summer and winter heat/cooling configurations. A series of the reservoirs may be used for appropriate heat transfer. The water volume of the reservoirs is relatively large and slow moving for good earth heat conduction. The reservoirs include first and second ports, one of which has an elongate internal tube that has a bottom that resides adjacent a bottom of the reservoir body and a series of apertures on only a lower portion of the internal tube to intake or output liquid depending on flow direction.

19 Claims, 14 Drawing Sheets

(56) References Cited

U.S. PATENT DOCUMENTS

| | | |
|---|---|---|
| 3,552,435 A | 1/1971 | Andersson et al. |
| 4,095,584 A | 6/1978 | Pies |
| 4,142,576 A | 3/1979 | Perry et al. |
| 4,237,859 A | 12/1980 | Goettl |
| 4,375,831 A | 3/1983 | Downing |
| 4,441,902 A | 4/1984 | Jardine |
| 4,484,566 A | 11/1984 | Gonzalez |
| 4,524,609 A | 6/1985 | Sharp |
| 4,590,992 A | 5/1986 | Tamblyn |
| 4,643,212 A | 2/1987 | Rothrock |
| 4,732,925 A | 3/1988 | Davis |
| 4,796,676 A | 1/1989 | Hendershot et al. |
| 4,810,565 A | 3/1989 | Wasitis et al. |
| 4,898,150 A | 2/1990 | Lewis |
| 4,987,922 A | 1/1991 | Andrepont et al. |
| 5,046,529 A | 9/1991 | Corella |
| 5,054,327 A | 10/1991 | Gould |
| 5,162,436 A | 11/1992 | Davis et al. |
| 5,197,513 A | 3/1993 | Todd et al. |
| 5,204,148 A | 4/1993 | Alexander et al. |
| 5,224,357 A | 7/1993 | Galiyano et al. |
| 5,242,970 A | 9/1993 | Davis et al. |
| 5,256,228 A | 10/1993 | Davis et al. |
| 5,286,798 A | 2/1994 | Davis et al. |
| 5,370,755 A | 12/1994 | Davis et al. |
| 5,381,860 A | 1/1995 | Mather |
| 5,389,715 A | 2/1995 | Davis et al. |
| 5,512,118 A | 4/1996 | Davis et al. |
| 5,582,890 A | 12/1996 | Davis et al. |
| 5,700,538 A | 12/1997 | Davis et al. |
| 5,730,208 A | 3/1998 | Barban |
| 5,854,327 A | 12/1998 | Davis et al. |
| 6,138,614 A | 10/2000 | Shropshire |
| 6,138,744 A | 10/2000 | Coffee |
| 6,158,853 A | 12/2000 | Olsen et al. |
| 6,199,515 B1 | 3/2001 | Clarke |
| 6,510,819 B1 | 1/2003 | Pollock et al. |
| 6,553,947 B2 | 4/2003 | Bradenbaugh |
| 7,861,678 B2 | 1/2011 | Mcclellan |
| 9,284,952 B2 | 3/2016 | Peele |
| 9,511,382 B2 | 12/2016 | Strand |
| 2005/0092261 A1 | 5/2005 | Newman |
| 2007/0199341 A1 | 8/2007 | Hart |
| 2007/0227468 A1 | 10/2007 | Gordon et al. |
| 2009/0000573 A1 | 1/2009 | Mc |
| 2009/0086554 A1 | 4/2009 | Chanussot et al. |
| 2009/0121488 A1 | 5/2009 | Bhatti et al. |
| 2009/0165992 A1 | 7/2009 | Song |
| 2010/0122669 A1 | 5/2010 | Hughes |
| 2010/0193152 A1 | 8/2010 | Singleton et al. |
| 2010/0307147 A1 | 12/2010 | Ivy et al. |
| 2011/0011558 A1 | 1/2011 | Dorrian et al. |
| 2011/0067437 A1 | 3/2011 | Song |
| 2011/0100587 A1 | 5/2011 | Yang |
| 2011/0220340 A1 | 9/2011 | Eriksson |
| 2011/0247572 A1 | 10/2011 | Smith et al. |
| 2012/0045286 A1 | 2/2012 | Oliveira |
| 2012/0144829 A1 | 6/2012 | Wiggs et al. |
| 2014/0026568 A1 | 1/2014 | Peele |
| 2016/0040906 A1* | 2/2016 | Aguilar ............... F24H 9/2021 392/451 |
| 2016/0123629 A1 | 5/2016 | Song |
| 2017/0115030 A1 | 4/2017 | Lowdermilk et al. |

* cited by examiner

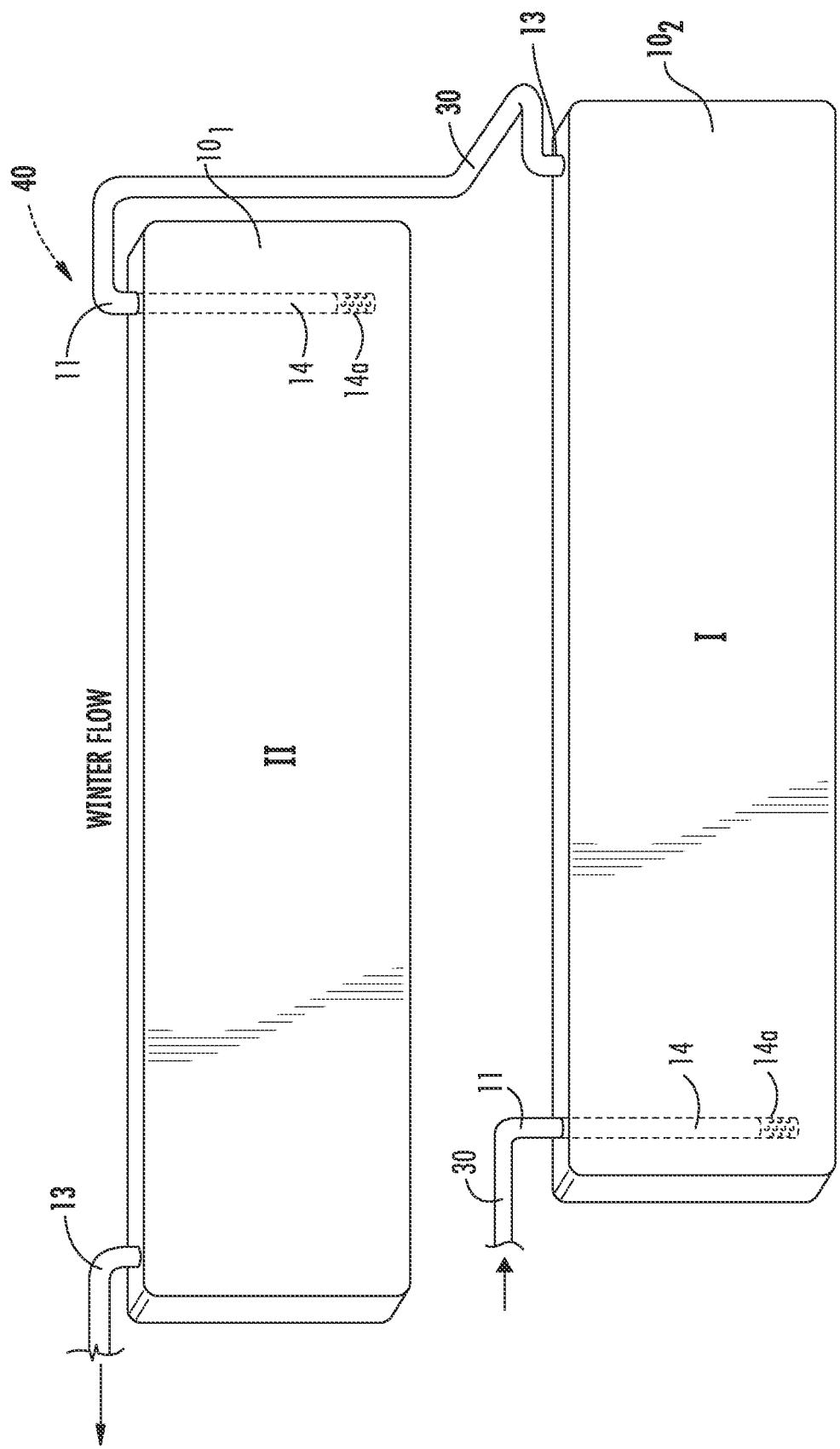

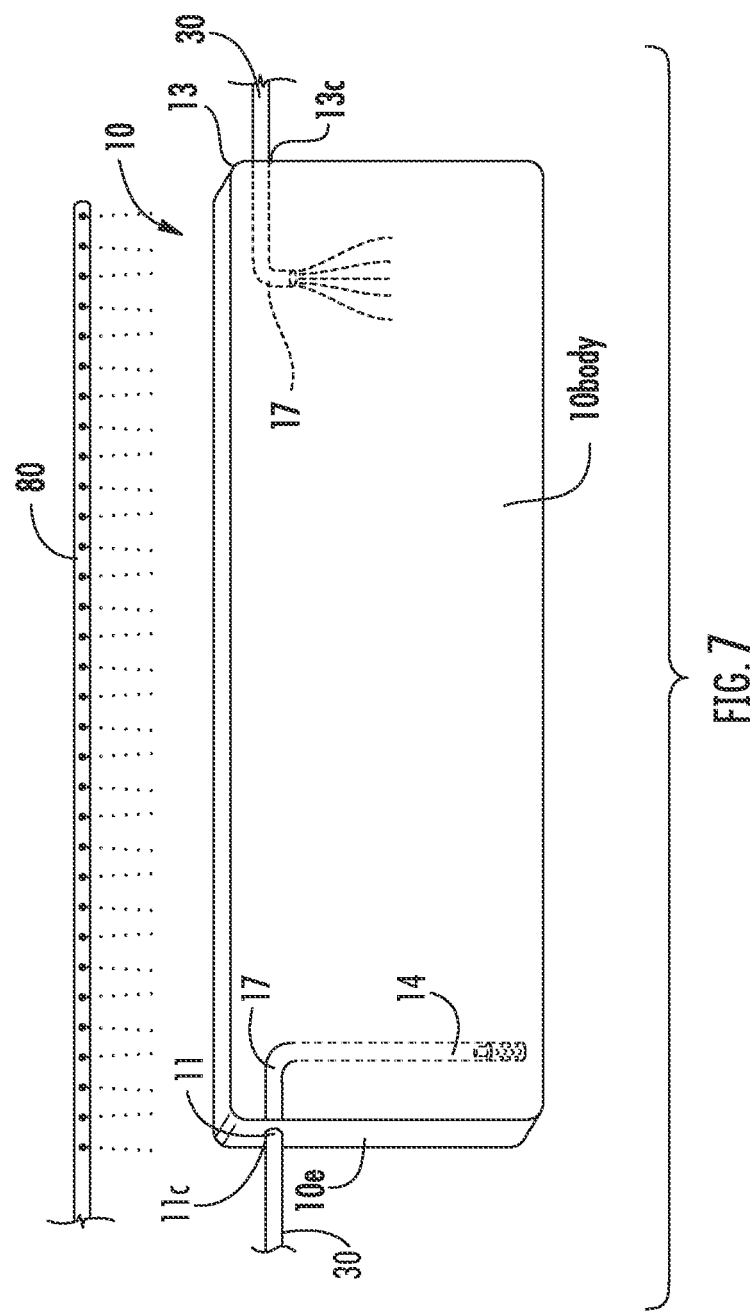

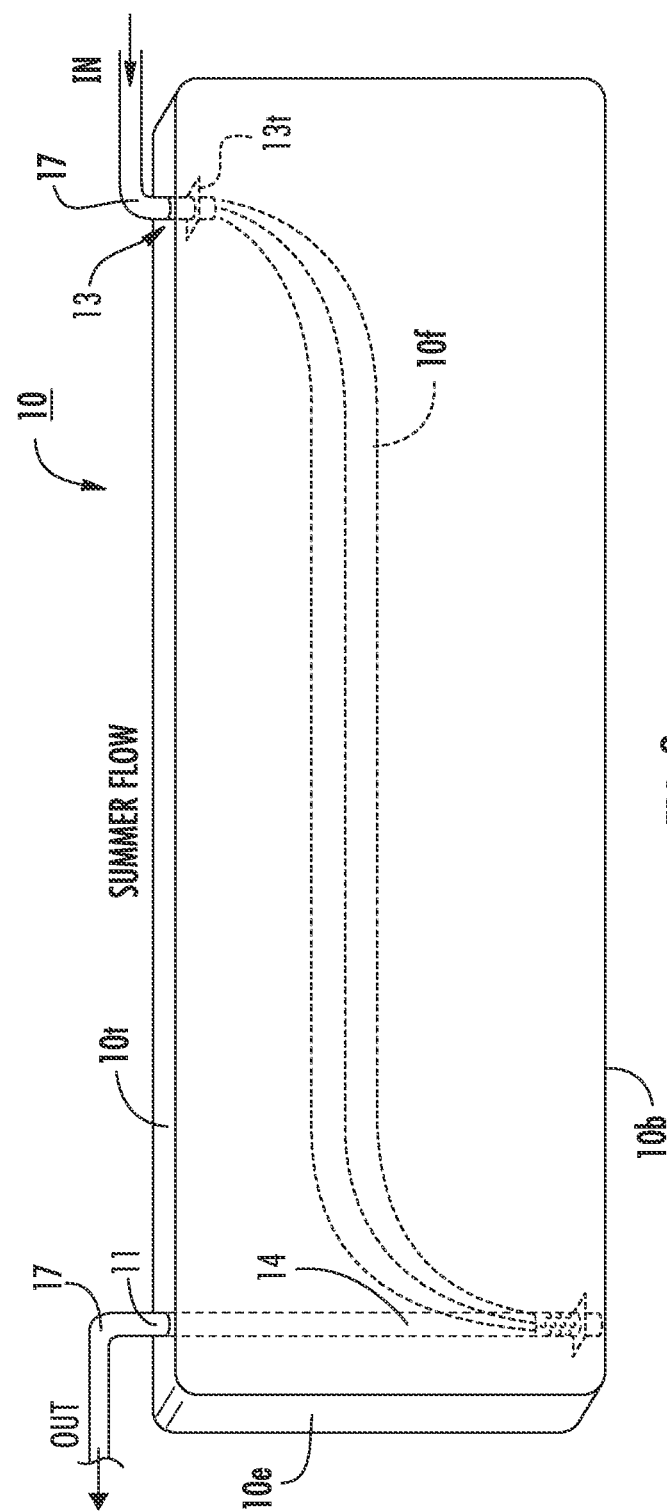

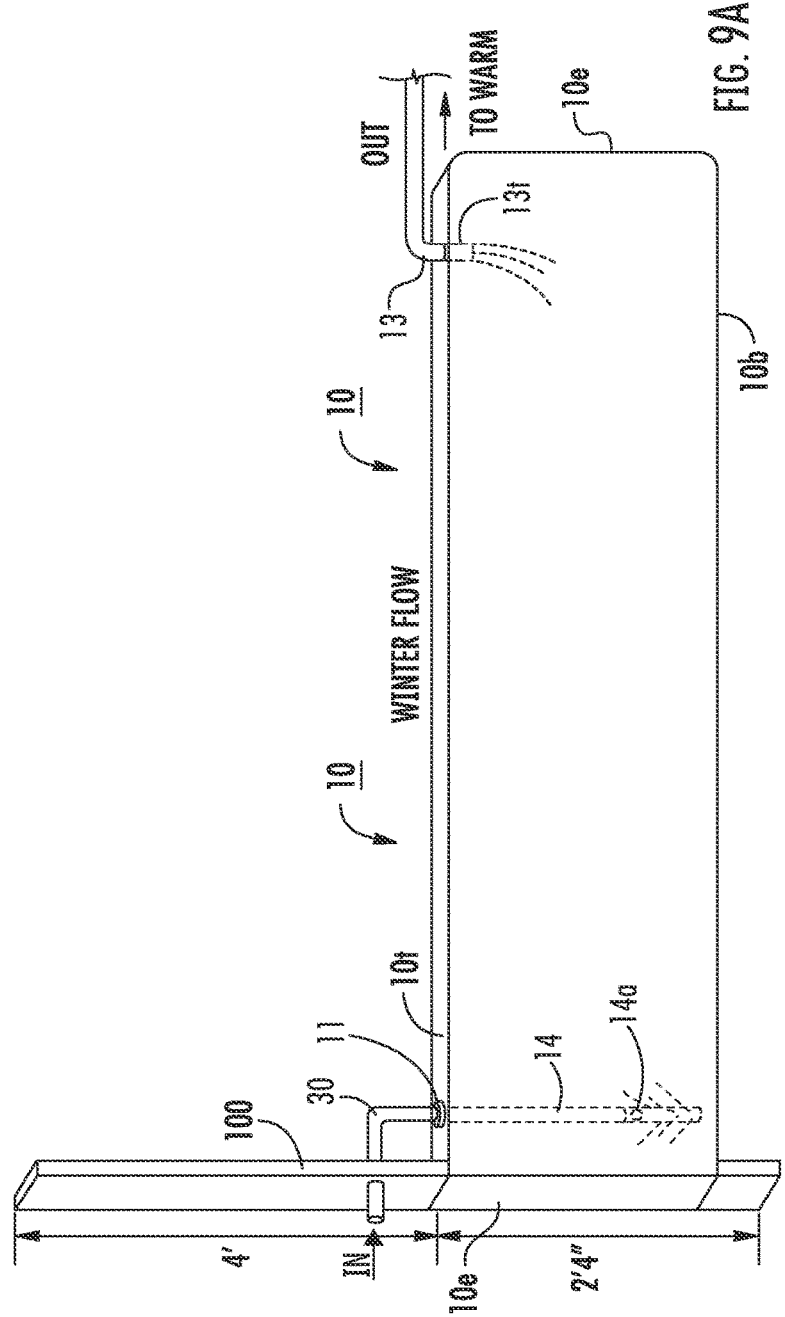
FIG. 9A
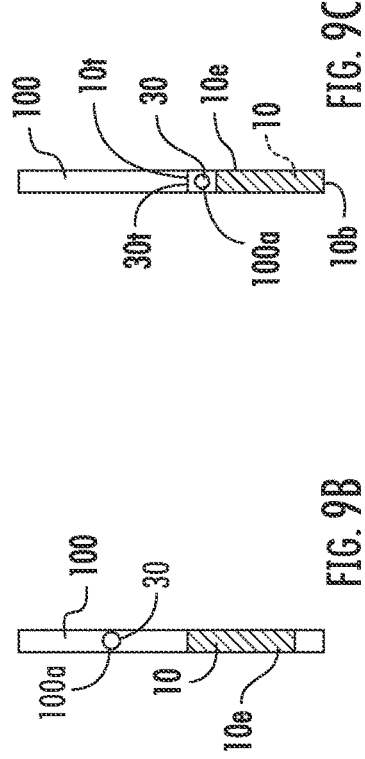
FIG. 9B
FIG. 9C

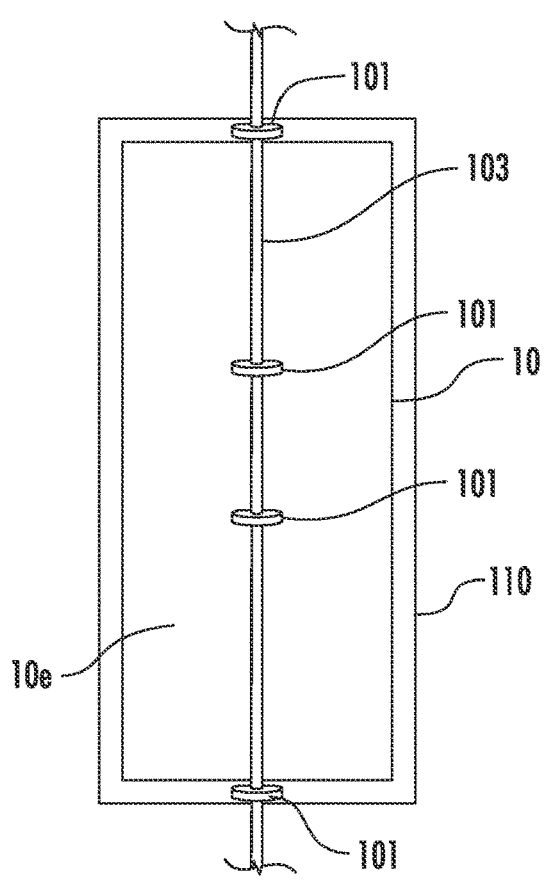
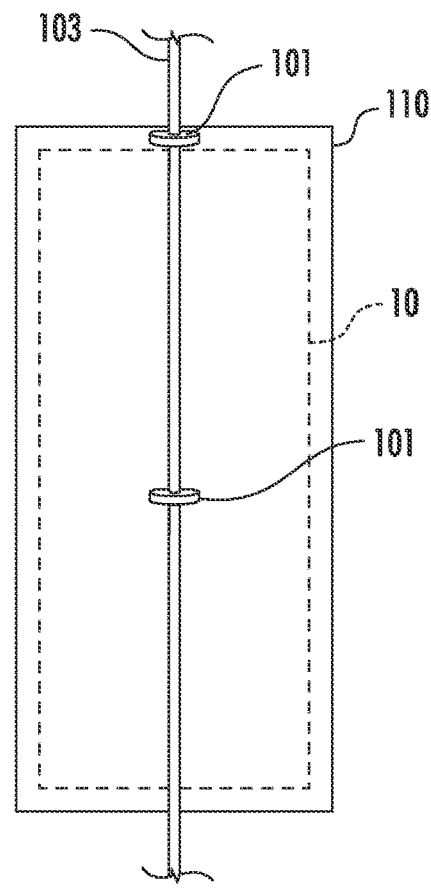
FIG. 11A  FIG. 11B
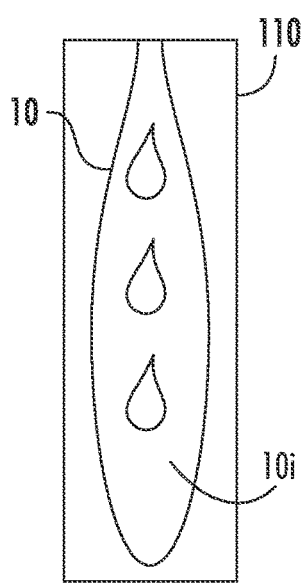
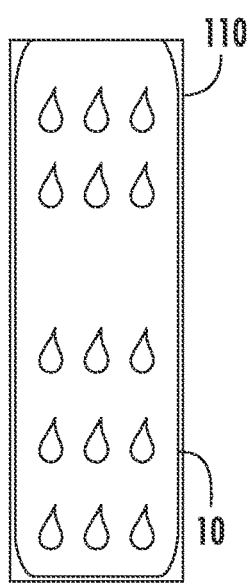
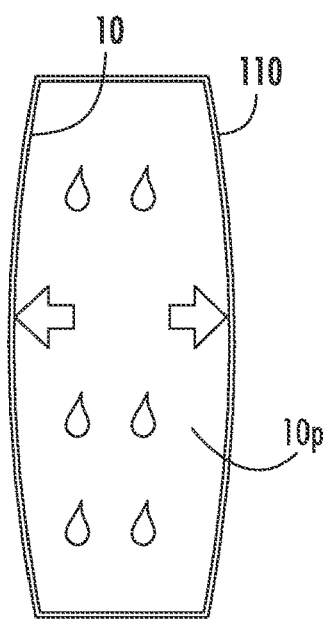
FIG. 12A  FIG. 12B  FIG. 12C

GEOTHERMAL HEAT EXCHANGE RESERVOIRS AND RELATED METHODS AND SYSTEMS

RELATED APPLICATIONS

This patent application is a divisional of U.S. patent application Ser. No. 16/547,082, filed Aug. 21, 2019, which claims priority to and the benefit of U.S. Provisional Application Ser. No. 62/721,938, filed Aug. 23, 2018, the contents of which are hereby incorporated by reference as if recited in full herein.

FIELD OF THE INVENTION

This invention relates to geothermal heat exchangers.

BACKGROUND

Geothermal heat exchangers are well known and include closed geothermal ground horizontal or vertical loops. In a closed loop system, a loop of piping is buried underground and filled with liquid such as water or antifreeze that continuously circulates through the system.

Horizontal geothermal ground loops typically use several hundred feet of four to six feet deep trenches. Piping is laid in the trench and backfilled. A typical horizontal ground loop will employ several hundred feet of pipe for each ton of heating and cooling. The horizontal pipes can be straight pipes but are more typically coiled type, the so-called "slinky coil" configuration with overlapped loops of piping arranged horizontally along the bottom of a wide trench. See, e.g., U.S. 2011/0011558, the contents of which are hereby incorporated by reference as if recited in full herein.

Vertical or deep bore geothermal ground loops are typically placed into the ground at much deeper depths than the trench based systems, such as between 150-300 feet. In vertical geothermal ground loops, a drilling rig is used to drill 150 to 300 foot deep holes in which hairpin-shaped loops of pipe are dropped, then grouted. A typical vertical ground loop can also require several hundred feet of pipe per ton of heating and cooling. Drilling costs are more expensive than trenching excavation costs.

Despite the foregoing, there remains a need for economic alternative geothermal heat exchangers.

SUMMARY OF EMBODIMENTS OF THE INVENTION

Embodiments of the invention are directed to trench conformable geothermal heat exchange reservoirs, related methods and systems.

Some embodiments are directed to geothermal heat exchangers for ground trenches. The geothermal heat exchangers include a substantially rectangular flexible or semi-flexible reservoir body having width, height, and length dimensions. The reservoir body has at least one inlet port and at least one exit port, both residing on an upper end portion of the reservoir body, spaced apart in a length dimension.

Embodiments of the invention are directed to geothermal heat exchangers for a ground trench. The geothermal heat exchangers include a reservoir body having width, height, and length dimensions. The reservoir body has a top, a bottom, a pair of long sides defining front and rear opposing primary walls and a pair of opposing end walls. The reservoir body also has first and second fluid ports that are spaced apart along the length dimension. The first and second fluid ports both reside on an upper portion of the reservoir body. The first fluid port has an elongate internal tube having a length sufficient to place a bottom of the internal tube in abutting contact with or adjacent the bottom of the reservoir body. The elongate internal tube has a plurality of through apertures on a lower portion thereof.

The heat exchanger can include an end cap coupled to a bottom of the elongate internal tube.

The apertures can reside only along a sub-length of the elongate internal tube and within a distance of about 6 inches from the bottom of the reservoir body.

The bottom of the internal tube can reside about 2 inches or less from the bottom of the reservoir body.

The width dimension can be in a range of about 4-6 inches and the length dimension can be at least two times greater than the height dimension.

The second port can include an internal tube that has a length that is less than half the length of the length of the elongate internal tube of the first port.

The reservoir body can be configured to expand from a pre-installation shape to a liquid-filled post-installation shape and retain the filled shape during operation.

The first and second ports can each comprise at least one collar that defines an attachment interface for the reservoir body.

The at least one collar can include first and second cooperating collars that sandwich a wall thickness of a wall of the top or end of the reservoir therebetween.

The first and second ports can have external conduit fittings that engage pipe or conduit in a geothermal loop adapted to be in fluid communication with a water source heat pump or water-cooled condenser.

The reservoir body can be sized and configured to reside in a horizontal trench at a depth below ground surface of a range of 2-6 feet and the pair of long sides can have sufficient flexibility to be able to expand to conform to respective sidewalls of a trench of compacted virgin earth.

The reservoir body can have a thin, water-impermeable material defining at least the pair of long sides.

The width dimension can be in a range of about 4-6 inches. The height dimension can be in a range of about 2-6 feet and the length dimension can be in a range of about 10-100 feet The width dimension can be in a range of about 4-6 inches. The height dimension can be in a range of about 2-4 feet. The length dimension can be in a range of about 20-30 feet.

Yet other embodiments are directed to geothermal closed loop heat exchange systems. The systems include at least one geothermal heat exchange reservoir residing in a horizontal trench a distance below ground surface. The at least one heat exchange reservoir has a reservoir body that is flexible and includes front and rear primary walls that snugly contact and conform to a respective adjacent trench wall. The reservoir body has width, height, and length dimensions, and includes a top, a bottom, and a pair of opposing end walls that join the front and rear primary walls. The reservoir body comprises first and second fluid ports that are spaced apart along the length dimension. The first and second fluid ports both reside on an upper portion of the reservoir body. The first fluid port includes an elongate internal tube having a length sufficient to place a bottom of the internal tube in abutting contact with or adjacent the bottom of the reservoir body. The elongate internal tube has a plurality of through apertures on a lower portion thereof. The geothermal closed loop heat exchange system also includes a heat pump or water condenser and a closed loop flow path having a flow direction connecting the first and second ports of the at least one geothermal heat exchange reservoir to the heat pump or water condenser to thereby define a closed loop geothermal heat exchange system.

The top of the reservoir body can reside a distance in a range of 2-4 feet above the bottom of the reservoir body. The width dimension can be in a range of 1-12 inches. The internal tube can have a closed bottom end, optionally closed by an end cap coupled to the bottom of the internal tube.

The apertures can reside along only a sub-length of the elongate internal tube, within a distance of 6 inches from the bottom of the reservoir body, and closer to one end wall than the other end wall.

The first and second fluid ports can reside on a top of the reservoir body.

The width dimension can be in a range of about 4-6 inches. The length dimension can be in a range of about 10-100 feet. The bottom of the internal tube can reside in a range of 0 and 2 inches from the bottom of the reservoir body.

The at least one heat exchange reservoir can be a plurality of geothermal heat exchange reservoirs in fluid communication, and for summer and/or warm weather, water can serially flow in the flow path in a direction reverse from a winter and/or cold weather direction.

The reservoir body can be rectangular with a width, length and height and is sized and configured to reside in a horizontal trench at a depth below ground surface in a range of about 2-6 feet. The reservoir body can be defined by a thin, water-impermeable material. The width dimension can be in a range of 4-6 inches. The height dimension can be in a range of about 2-4 feet. The length dimension can be in a range of 20-30 feet.

Yet other embodiments are directed to methods of installing a geothermal heat transfer system. The methods include placing a geothermal heat exchange reservoir in a horizontal trench having a floor and upwardly extending trench sidewalls. The geothermal heat exchange reservoir includes a flexible reservoir body having width, height, and length dimensions. The reservoir body has a top, a bottom, a pair of long sides and a pair of opposing end walls and first and second fluid ports that are spaced apart along the length dimension. The first and second fluid ports both reside on an upper portion of the reservoir body. The first fluid port includes an elongate internal tube having a length sufficient to place a bottom of the elongate internal tube abutting the bottom or adjacent the bottom of the reservoir body. The elongate internal tube has a plurality of through apertures on a lower portion thereof. The method further includes filling the heat exchange reservoir with liquid causing the reservoir body to expand to snugly contact and conform to the trench sidewalls.

The reservoir body can be rectangular and can have a length dimension in a range of about 10-100 feet and a width dimension in a range of about 2-4 inches.

The placing can be carried out to place the reservoir in a compacted, virgin earth trench providing the trench walls. The filling can be carried out to cause the bottom and long sides of the reservoir body forming front and rear walls to snugly contact and conform to the compacted virgin earth trench defining a respective trench bottom as well as the trench sidewalls to facilitate heat transfer.

The method can further include placing a second flexible geothermal heat exchange reservoir in a different horizontal trench having a floor and upwardly extending trench sidewalls. The second flexible geothermal heat exchange reservoir can have a reservoir body having width, height, and length dimensions. The reservoir body has a top, a bottom, a pair of long sides and a pair of opposing end walls and includes first and second fluid ports that are spaced apart along the length dimension. The first and second fluid ports can both reside on an upper portion of the reservoir body. The first fluid port includes an elongate internal tube having a length sufficient to place a bottom of the internal tube in abutting contact with or adjacent the bottom of the reservoir body and the elongate internal tube can have a plurality of through apertures on a lower portion thereof, The method can include filling the second heat exchange reservoir with liquid causing the reservoir to expand to snugly contact and conform to the trench sidewalls and connecting a closed loop flow path from the first and second reservoirs to a heat pump or water cooled condenser.

Additional embodiments are directed to methods of geothermal heat transfer. The methods include: flowing liquid from a pump associated with a heat exchanger or water-cooled condenser in a closed geothermal loop in a first flow direction during summer and in an opposing second flow direction during winter. The flowing is carried out so that liquid flows into a first port of a flexible reservoir body that resides in a horizontal trench a distance below ground surface with primary rear and front walls that snugly contact and conform to a trench wall shape thereat, then out of a spaced apart second port. The flexible reservoir body has a top, a bottom, opposing front and rear walls and opposing end walls spaced apart in a length direction. One of the first port or the second port comprises an elongate tube having a closed bottom residing in abutting contact with or adjacent a bottom of the bottom of the reservoir and a plurality of apertures in a lower portion of the elongate tube. The flexible reservoir body has a width that is in a range of about 1-12 inches, a height in a range of 1-4 feet and a length in a range of about 10-100 feet. The flowing the liquid includes flowing liquid into or out of the apertures of the internal tube depending on whether liquid is flowing in the first flow direction or the second flow direction.

The rectangular body can have a width dimension that is between about 4-6 inches, and wherein the length dimension is at least two times greater than the height dimension.

The heat exchanger can include a length of pipe or conduit that extends a distance inward into the reservoir body from the inlet and exit ports.

The reservoir body can be configured to expand from a pre-installation shape to a liquid-filled post installation shape and retain that shape during operation.

The inlet and exit ports can include pipe or conduit fittings that engage pipe or conduit in a geothermal loop that is adapted to be in fluid communication with a water source heat pump or water-cooled condenser.

The heat exchangers can include at least one support member that is attached to the reservoir body to define an installation shape.

The reservoir body can be sized and configured to reside in a horizontal trench at a depth below ground surface of between 2-6 feet.

The reservoir body can have a thin, water-impermeable material defining primary surfaces of a front and rear wall.

The width can be between about 4-6 inches, the height is between about 2-6 feet, and the length is between about 10-100 feet.

The width can be between about 4-6 inches, the height can be between about 2-4 feet, and the length can be between about 20-30 feet.

The heat exchanger can also include a plurality of spaced apart internal partitions alternating to define upper and lower reduced open flow spaces along the length dimension of the reservoir.

The heat exchanger can include a jig with an upper rigid rectangular frame with downwardly extending sidewalls enclosing an upper portion of the reservoir body that is releasably attached to an upper surface of the reservoir body to facilitate installation and proper filling/shape control.

Other embodiments are directed to geothermal closed loop heat exchange systems. The systems include at least one flexible or semi-flexible geothermal heat exchange reservoir having at least one inlet port and at least one exit port residing in a horizontal trench a distance below ground surface. The heat exchange reservoir has front and rear primary walls with an expanded shape that snugly contacts and conforms to a shape of adjacent trench walls. The systems also include a heat pump or water condenser and a closed loop flow path having a flow direction connecting the inlet port and the exit port of the reservoir to the heat pump or water condenser to define a closed loop geothermal heat exchange system.

The at least one reservoir can be substantially rectangular, with a width dimension being between 1-12 inches, and wherein the inlet port and exit ports reside on opposing end portions of the reservoir, one at an upper portion and the other at a lower portion.

The at least one reservoir can be a plurality of geothermal heat exchange reservoirs in fluid communication. The reservoirs have upper and lower fluid ports on opposing end portions thereof and (i) for winter and/or cold weather, water serially flows in the flow path into a respective lower port of a first reservoir, then out of corresponding upper port, then into the lower port on a next reservoir and out of a corresponding upper port and (ii) for summer and/or warm weather, water serially flows in the flow path into a respective upper port of the first reservoir, then out of the lower port, then into the upper port of the next reservoir and out of the corresponding upper port.

The at least one reservoir has a substantially rectangular body with a width dimension that is between about 4-6 inches, and a length dimension that is between about 10-100 feet.

The reservoir body can be configured to expand from a pre-installation shape to a liquid-filled post installation shape and retain that shape during operation.

The reservoir body can reside inside thin, flexible external cover.

The inlet and exit ports can include pipe or conduit that extends a distance into the reservoir body to facilitate cross flow. The reservoir body can have at least one support member that is attached to the reservoir body to define an installation shape.

The reservoir body can be substantially rectangular with a width, length and height and is sized and configured to reside in a horizontal trench at a depth below ground surface of between 2-6 feet. The reservoir can have a body with a thin, water-impermeable material defining primary surfaces of a front and rear wall. The width can be between about 4-6 inches, the height can be between about 2-4 feet, and the length can be between about 20-30 feet.

Still other embodiments are directed to methods of installing a geothermal heat transfer system. The methods include: (a) placing a flexible or semi-flexible geothermal heat exchange reservoir with at least one inlet port and at least one spaced apart outlet port in a horizontal trench having a floor and upwardly extending trench walls; and (b) filling the heat exchange reservoir with liquid causing the reservoir to expand to snugly contact and conform to the trench walls.

The reservoir can be substantially rectangular and can have a length that is between about 10-100 feet and a width between about 2-4 inches.

The method can include placing a second flexible or semi-flexible geothermal heat exchange reservoir with at least one inlet port and at least one spaced apart outlet port in a different horizontal trench having a floor and upwardly extending trench walls, filling the second heat exchange reservoir with liquid causing the reservoir to expand to snugly contact and conform to the trench walls, and connecting a closed loop flow path from the reservoirs to a heat pump or water cooled condenser.

The reservoir can reside inside a flexible outer cover and the method can further include expanding the cover outward as the reservoir expands in response to filling the reservoir.

The reservoirs can have upper and lower fluid ports on opposing end portions thereof, and flow in the closed loop flow path can be in a first direction in cold weather and in an opposing direction in warm weather such that (i) for winter and/or cold weather, water serially flows in the flow path into a respective lower port of a first reservoir, then out of corresponding upper port, then into the lower port on a next reservoir and out of a corresponding upper port and (ii) for summer and/or warm weather, water serially flows in the flow path into a respective upper port of the first reservoir, then out of the lower port, then into the upper port of the next reservoir and out of the corresponding upper port.

The methods can include releasably attaching a jig comprising an upper rigid rectangular frame with downwardly extending sidewalls to an upper portion of the reservoir body so that the upper portion of the reservoir body is enclosed in the jig before the filling step, then removing the jig from the reservoir body after the filling step.

Still other embodiments are directed to methods of geothermal heat transfer. The methods include flowing water from a pump associated with a heat exchanger or water-cooled condenser in a closed loop a first direction during summer and an opposing direction during winter so that the water flows through at least one substantially rectangular flexible or semi-flexible reservoir with a width dimension that is between about 1-12 inches, and a length dimension that is between about 10-100 feet, wherein the reservoir resides in a horizontal trench a distance below ground surface with primary rear and front walls that snugly contact and conform to a trench wall shape thereat.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

The foregoing and other objects and aspects of the present invention are explained in detail in the specification set forth below.

BRIEF DESCRIPTION OF THE DRAWINGS

FIG. 3B is a side perspective view of an example of a multiple-reservoir system with flow direction illustrated for winter flow according to embodiments of the present invention.

FIG. 7 is a side perspective view of yet another example geothermal system according to embodiments of the present invention.

FIG. 8 is a front schematic view of a geothermal reservoir illustrating summer flow direction according to embodiments of the present invention.

FIG. 9A is a front schematic view of a geothermal reservoir illustrating a winter flow direction according to embodiments of the present invention.

FIG. 9B is a schematic illustration of an example support member for a geothermal reservoir according to embodiments of the present invention.

FIG. 9C is a schematic illustration of another example support member for a geothermal reservoir according to embodiments of the present invention.

FIG. 11A is an end view of another embodiment of a geothermal reservoir according to embodiments of the present invention.

FIG. 11B is an end view of another embodiment of a geothermal reservoir according to embodiments of the present invention.

FIGS. 12A-12C are schematic section sequential views of filling a flexible reservoir held inside a flexible outer cover according to embodiments of the present invention.

DESCRIPTION OF EMBODIMENTS OF THE INVENTION

Figure 1:
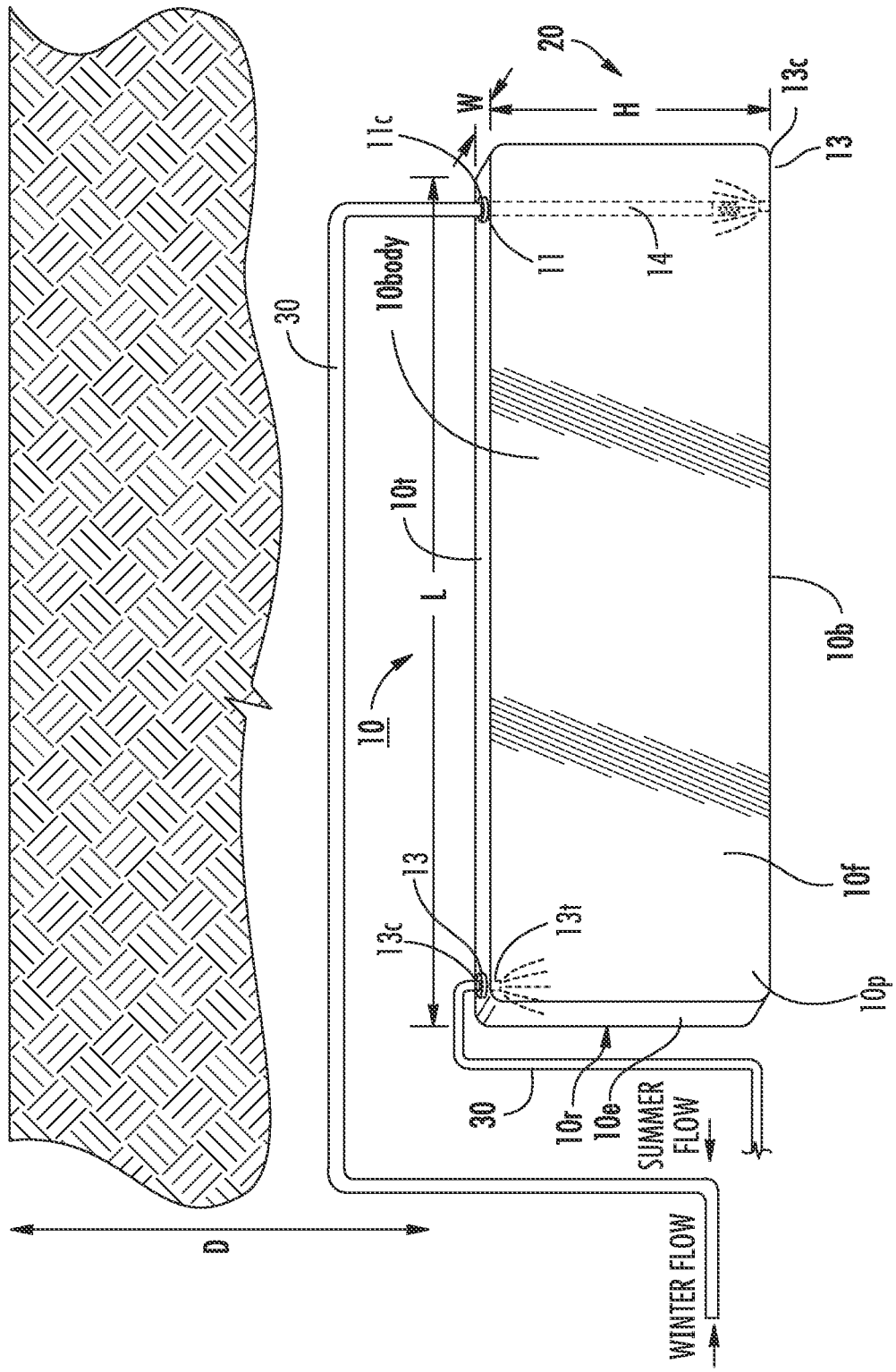
FIG. 1 is a schematic illustration of a geothermal heat transfer reservoir according to embodiments of the present invention.

The present invention will now be described more fully hereinafter with reference to the accompanying figures, in which embodiments of the invention are shown. This invention may, however, be embodied in many different forms and should not be construed as limited to the embodiments set forth herein. Like numbers refer to like elements and different embodiments of like elements can be designated using a different number of superscript indicator apostrophes (e.g., 10, 10', 10", 10'''). The terms "Fig." and "FIG." may be used interchangeably with the word "Figure" as abbreviations thereof in the specification and drawings. In the figures, certain layers, components or features may be exaggerated for clarity, and broken lines can illustrate optional or internal features or operations unless specified otherwise. In addition, the sequence of operations (or steps) is not limited to the order presented in the figures and/or claims unless specifically indicated otherwise. In the drawings, the thickness of lines, layers, features, components and/or regions may be exaggerated for clarity and broken lines illustrate optional features or operations, unless specified otherwise.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" when used in this specification, specify the presence of stated features, regions, steps, operations, elements, and/or components, but do not preclude the presence or addition of one or more other features, regions, steps, operations, elements, components, and/or groups thereof. As used herein, the term "and/or" includes any and all combinations of one or more of the associated listed items.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of relative explanation only unless specifically indicated otherwise.

The term "about" means that the recited parameter can vary from the recited number, typically by +/−20%.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that although the terms "first" and "second" are used herein to describe various regions, layers and/or sections, these regions, layers and/or sections should not be limited by these terms. These terms are only used to distinguish one region, layer or section from another region, layer or section. Thus, a first region, layer or section discussed below could be termed a second region, layer or section, and similarly, a second without departing from the teachings of the present invention.

The terms "virgin compacted soil" or "virgin compacted earth" refer to natural earth content that is compacted to form a trench without requiring special land fill or added earth or soil content to allow a respective reservoir to have good heat transfer with the virgin compacted earth.

Referring now to the figures, FIG. 1 illustrates a geothermal liquid reservoir 10 that is sized and configured to reside in a substantially horizontal ground trench 20 (FIGS. 2B, 3A) and can be used in lieu of or with conventional geothermal heat exchangers, including all pipe type heat exchangers, vertical, horizontal, coiled or pond.

Figure 2A:
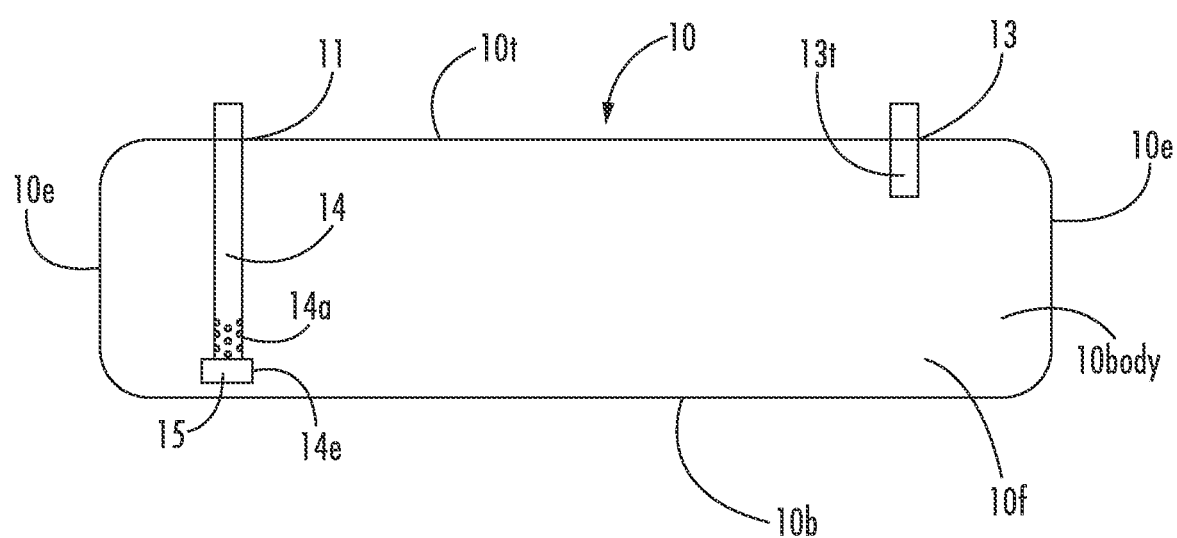
FIG. 2A is a side view of an example of a geothermal heat transfer reservoir according to some embodiments of the present invention.
Figure 2B:
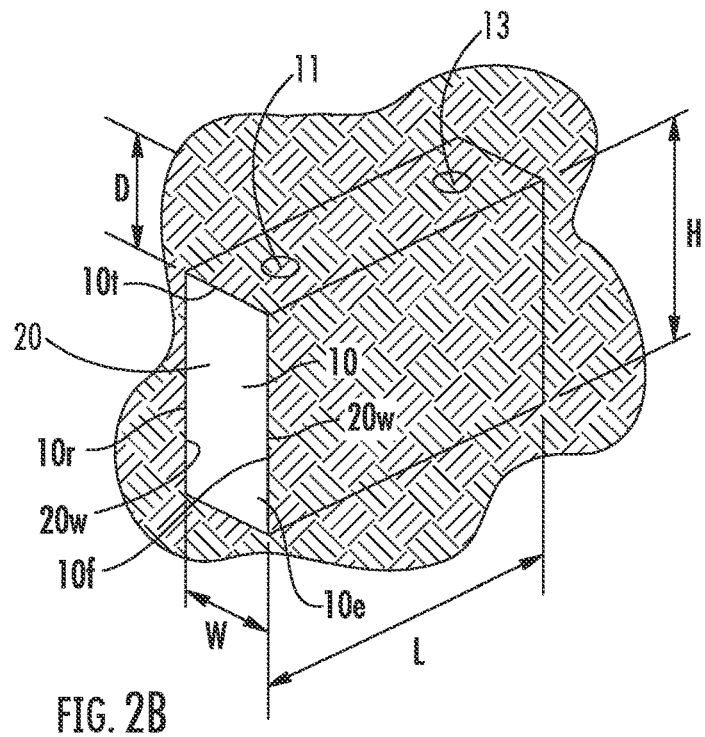
FIG. 2B is a partial side perspective view of a geothermal heat transfer reservoir in operative position and configuration in a horizontal trench according to embodiments of the present invention.

In some embodiments, as shown by way of example only in FIGS. 2A and 2B, the reservoir body 10body with ends 10e, a bottom 10b, top 10t and primary sidewalls 10f, 10r. The reservoir body 10body can change in external shape from a pre-installation configuration 10i (FIGS. 12A, 17) to a post-installation (and liquid-filled) configuration 10p (FIGS. 1, 12C), e.g., it can expand outward a sufficient distance to conform to a shape of the adjacent trench wall 20w (FIG. 3), so as to substantially retain the rectangular shape and retain this shape during operation, once filled. The post-fill shape can have, for example, sides 10r, 10f, more typically ends 10e, that may be bowed outward to snugly contact adjacent (virgin, compacted) soil immediately upon liquid fill without requiring additional compaction or special fill at installation in a manner that can allow for good heat transfer with earth. The flexible or semi-flexible reservoir 10 can also be described as a bladder.

The reservoir body 10body can conformably contact a shape of the earth trench walls 20w during fill with the water/liquid, which can provide for maximum geothermal heat transfer (to the earth). The reservoir 10 can be provided with fittings 11c, 13c pre-attached and/or with partial lengths of pipe 30 or these components may be attached at a field use site. FIG. 7 illustrates an end wall 10e penetration entry/exit of the pipe 30 at ports 11, 13 while FIGS. 1 and 2A illustrate top wall 10t entry/exit at the respective ports 11, 13. The ports 11, 13 can be spaced apart in a length direction of the reservoir body 10body.

In some embodiments, it may be possible to inflate or partially inflate the reservoir 10 with gas for ease in installation to help provide desired structure for positioning. End caps can be used to cover the ports 11, 13. Once in place, the gas can be released.

Figure 3A:
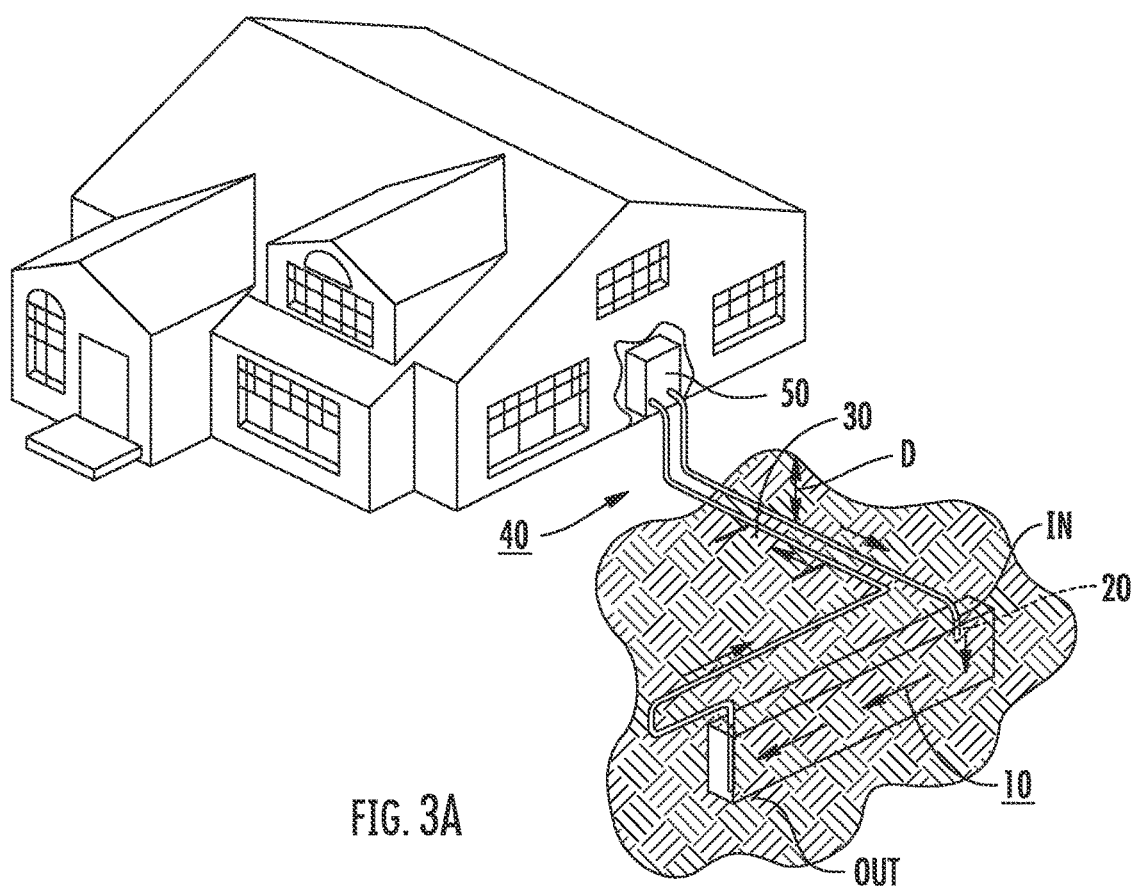
FIG. 3A is a top perspective view of a geothermal heat transfer system using at least one flexible or semi-flexible reservoir according to embodiments of the present invention.

Referring to FIG. 2B, the reservoir body 10body can be sufficiently flexible to be able to be folded and/or rolled for shipment/pre-installation and expand an amount sufficient to conform to the trench shape so that each outer primary wall 10f, 10r snugly abuts against an adjacent upwardly extending (of virgin, compacted earth) trench wall 20w, in use, when filled or partially filled with liquid, such as water. The bottom of the reservoir 10b can also expand to contact the adjacent soil. No special back fill or packing is required at installation. The bottom of the reservoir 10b can reside on the trench floor at the bottom of the trench. The trench 20 (typically only the top or ends) can be filled with soil after placement of the reservoir 10 and associated piping 30 as shown in FIG. 3A so that the trench reservoir 10 is encased in virgin, relatively compact soil or other ground materials thereat. The terms "full" and "filled" means that the reservoir has a normal operating volume but is not required to be at full volumetric capacity.

Typically, as shown in FIG. 2B, the two primary surfaces 10f, 10r and the bottom 10b will be substantially flat, but expand sufficiently to snugly abut compacted virgin earth formed by the trench. The end walls 10e may not have the natural support of the trench, depending on how the trench is formed, so that the ends 10e may take on an expanded outwardly "bowed" shape during filling (FIG. 12C). Alternatively, the ends of the trench can be filled to provide sufficient support prior to or during the "filling" of the reservoir 10.

FIG. 7 also illustrates that the geothermal ground loop 40 can include at least one optional trickle line or conduit 80 that resides above the reservoir 10, typically adjacent or a distance above such as between about 1 inch to about 1 foot above the reservoir, and is used to moisten an external surface of the reservoir 10 and/or soil thereabout to facilitate heat conduction. The trickle line 80 can be configured as a conventional "soaker line" in greenhouses or other low flow type system. Where available, the at least one trickle line 80 can be connected to a non-potable or an untreated water source.

The reservoir 10 can comprise any suitable impermeable and/or water proof material, typically having a wall thickness that does not unduly negatively impact heat transfer. The reservoir 10 can comprise a polymeric material having a wall thickness of between about 20 mils (0.002 inches) to about 100 mils (0.0100 inches), typically between about 20 mils to about 60 mils. In some embodiments, the reservoir 10 can comprise ethylene-propylene-diene monomer or terpolymer (EPDM) based, polyethylene, or other synthetic or natural rubber material such as those materials used for pool or ground liners and the like. The reservoir 10 can comprise a laminated material configuration of different layers of different materials or may comprise a unitary monolithic material. In some embodiments, a foil or other heat conductive layer and/or coating may be used on an inner and/or outer surface to facilitate heat transfer.

In some embodiments, the reservoir 10 can comprise a material similar to geomembranes (also known as geomembrane liners) including thermoset, thermoplastic or thermoformable materials.

In one or more embodiments the reservoir may be TPO (thermoplastic-olefin) based. In yet other embodiments, the reservoir 10 may be PVC (polyvinyl chloride) based. In still other embodiments, the reservoir 10 may be a polypropylene-based sheet formed into the desired closed shape. In these or other embodiments, the geomembrane may be flexible and capable of being rolled up for shipment. In certain embodiments, the reservoir 10 may include fiber reinforcement such as geomembrane reinforcement materials that are well known to persons having ordinary skill in the art.

Useful EPDM materials include those that are conventional and commercially available. For example, EPDM geomembranes that may be appropriate for closed body reservoirs 10 are commercially available under the trade name "Pond Gard" from Firestone Specialty Products Company, LLC (Carmel, Ind.). Also, EPDM geomembranes are disclosed in numerous United States patents including U.S. Pat. Nos. 3,280,082, 4,732,925, 4,810,565, 5,162,436, 5,286,798, 5,370,755, 5,242,970, 5,512,118, 2,260,111, 5,256,228, 5,582,890, 5,204,148, 5,389,715, 5,854,327, 5,054,327, and 5,700,538, which are incorporated herein by reference for the purpose of teaching suitable water impermeable materials. Useful TPO membranes are available under the trade name "Firestone TPO GEOMEMBRANE" (Firestone Specialty Products). Useful flexible polypropylene sheets are available under the trade name "Firestone fPP-R GEOMEMBRANE" (Firestone Specialty Products).

The trench reservoir 10 may be flexible or semi-flexible and thin, so as to be unable to hold its closed operative shape without support outside the trench bed and may be rolled, folded or otherwise configured for shipment. The term "thin" means that the member is under about 0.010 inches thick. Rigid or semi-rigid internal or external ribs and/or other support members may be used to facilitate installation as will be discussed below. The term "semi-rigid" means that the noted component has sufficient rigidity to have a self-supporting shape but can flex up-down and/or side-side when exposed to compressive or tensile loading and/or during normal use.

The reservoir 10 can be configured to have a suitable burst strength or pressure suitable for the height of the unit 50 above the reservoir (FIG. 3A), typically able to withstand about 1 pound of pressure for every two feet. In some embodiments, the reservoir 10 can have a burst strength of about 15 psi or greater. In some embodiments, the burst strength is between about 15 psi to about 30 psi. However, reservoirs 10 can have other burst strengths/pressures, particularly those used for high rise buildings which may have greater burst strengths.

The reservoir 10 can have one or more seams that allow a flat sheet or sheets of flexible material to form the enclosed reservoir body. Again, the seams can be configured to withstand a defined burst strength.

FIG. 3A illustrates the reservoir 10 positioned adjacent a single family residence with associated flow path (closed loop) pipes or conduits 30 extending from unit 50 with a pump unit or units, e.g., a heat pump (e.g., a water source heat pump) and/or a water-cooled condenser to at least one geothermal reservoir 10 forming the geothermal ground loop 40. However, the reservoirs 10 may also be used for other geothermal ground loops, including residential and commercial or industrial applications such as, but not limited to, industrial buildings, office buildings, multi-dwelling residences, apartments, hotels, motels, and/or other facilities wishing to employ geothermal ground loops. The reservoirs 10 may also be used with pipes, straight and/or coiled or pond or other conventional geothermal ground loop heat transfer devices for a hybrid system allowing for greater flexibility in land use and/or ground loop configurations.

Referring again to FIGS. 1, 2B and 3A, the trench 20 typically resides a distance "D" (measured from an upper surface, e.g., the top 10t of the reservoir 10) that is between about 2-10 feet below the ground surface, more typically between about 4-6 feet sub-surface, but deeper or more shallow trenches may be appropriate in some uses.

The reservoir 10 can have a narrow substantially rectangular body 10body. The term "narrow" means that the reservoir is configured to have a length "L", a width "W" and a height "H" such that H and L are much larger than W, typically at least about three times larger. Other closed shapes may be used with suitable geothermal heat transfer surface areas, typically so that the width is much less than the length and/or height.

The width can be in a range of about 1 inch to about 12 inches but other widths may be used. Typically, the width is in a range of about 3-9 inches, and more typically between about 4-6 inches, such as about 4 inches, about 5 inches and about 6 inches.

The height dimension can be in a range of about 6 inches to about 6 feet, typically at least about 1 foot. The height can be about 2 feet, about 2.5 feet, about 3 feet, about 3.5 feet about 4 feet, about 4.5 feet, about 5 feet, about 5.5 feet or about 6 feet or any dimension therebetween (noting that a target 6 foot trench bed for the reservoir 10 typically requires excavation of an 8-12 foot trench, for a suitable subsurface depth).

In some embodiments, the length (L) is also greater than the height (H), typically at least 1.5 times greater, and more typically between about 2-20 times greater than H, such as, for example, about 3-10 times greater. The length dimension can be between about 5 feet to about 100 feet, typically between about 10 feet to about 100 feet, and more typically between about 25 feet to about 50 feet. In other embodiments, shorter or longer lengths may be used.

The L×H dimensions can be configured to provide a sufficient heat transfer area on the front and back walls 10f, 10r for the volume of liquid as the liquid flows from one end portion of the reservoir to the other, e.g., from an inlet to an outlet 11, 13 (which reverses for winter and summer flow).

In some embodiments, the reservoir 10 can be oriented so that its length dimension is substantially vertical rather than its height H, but this will require a deeper trench 20.

In some particular embodiments, the reservoir 10 can be about 4 or 6 inches wide, about 2 feet in height and about 25 feet long.

As shown in FIGS. 1 and 2A, the first and second ports 11, 13, corresponding to inlet and outlet ports, which reverse for winter and summer flow, are spaced apart in a length direction "L" to reside on opposing end portions of the reservoir body 10body. Each of the first and second ports 11, 13 can be on the top wall 10t of the reservoir body 10body. The first port 11 can have an internal tube 14 with a lower end portion 14e residing adjacent the bottom of the reservoir body 10body. The bottom of the internal tube can touch or abut the bottom 10b of the reservoir body 10body or reside a distance of about 2 inches or less above the bottom 10b of the reservoir body 10body. The second port 13 can have a shorter internal tube 13t. The shorter internal tube 13t can have a length that is in a range of about 0.25 inches to about 3 inches, more typically in a range of about 0.5 inches to 2 inches. The tubes 13t, 14 can reside a distance in a range of about 1 inch to 10 inches, more typically 4-8 inches, from a respective end wall 10e.

The internal tube 14 can have a plurality of open or through apertures 14a residing on the lower end portion 14e.

The remainder of the internal tube 14 can have solid outer wall to define an enclosed flow path to the port 11.

Figure 4A:
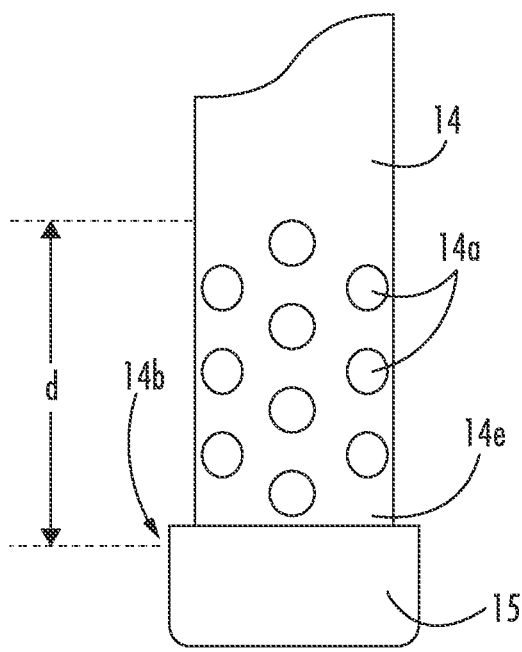
FIG. 4A is a partial enlarged view of an example internal tube for the reservoir shown in FIG. 1 according to embodiments of the present invention.
Figure 4B:
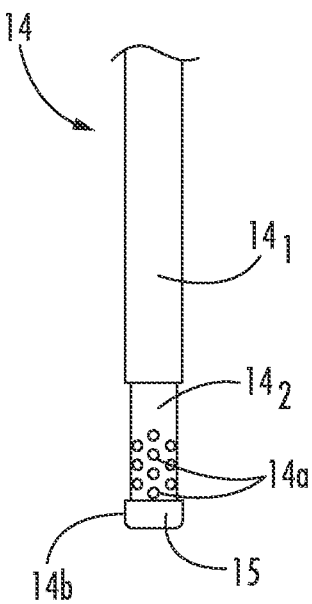
FIG. 4B is a partial schematic illustration of a telescoping internal tube according to embodiments of the present invention.

Referring to FIGS. 2A, 4A and 4B, the bottom end 14b of the internal tube 14 can be closed. In some embodiments, the closed bottom 14b can be provided by a closed end cap 15. The apertures 14a can reside a sub-length of the overall length of the internal tube 14, typically within a distance "d" in a range of about 0 to about 6 inches from the bottom of the tube 14b or end cap 15, and/or bottom 10b or the reservoir body such as a distance of about 6 inches or less, about 5 inches or less, about 4 inches or less, about 3 inches or less or about 2 inches or less.

The apertures 14a can be provided as an array of spaced apart apertures of a common shape or different shapes. The apertures 14a can be provided as a mesh, as slots or other aperture configurations. The closed end can prevent the tube from coupling to the reservoir body 10body on the bottom 10b, end wall 10e or on the sides 10f, 10r. The long internal tube 14 can prevent blockage of the port 11 while introducing the fluid toward the bottom 10b of the heat exchanger/reservoir body 10body. This configuration can allow both ports 11, 13 and respective port connections 11c, 13c to be at the top 10t of the heat exchanger/reservoir body 10body.

FIG. 4B illustrates that the internal tube 14 can have a telescoping configuration with cooperating first and second tube members 141, 142, the lower member comprising the through aperture 14a, optionally with a closed bottom 14b.

Figure 4C:
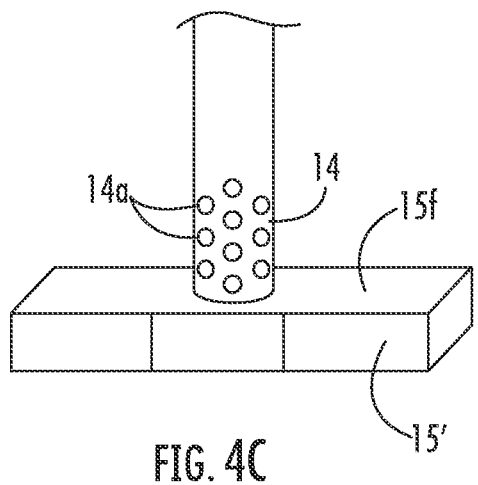
FIGS. 4C and 4D are partial schematic illustrations of an example internal tube with a lower foot coupled to or forming an end cap according to embodiments of the present invention.
Figure 4D:
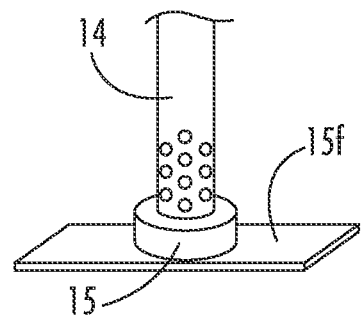

FIGS. 4C and 4D illustrates that the internal tube 14 can include a lower foot 15f coupled to or forming the end cap 15'. The foot 15f can be configured to press against the internal wall of the bottom 10b of the reservoir body 10body. The foot 15f may be elongate and extend in a length and width direction of the reservoir body 10body. The foot 15f can be circular or rectangular or have other shapes. FIG. 4D illustrates that the foot 15f can be planar with a thickness that is less than that of the end cap 15. FIG. 4C illustrates that the foot 15f can have a thickness corresponding to that of the end cap 15. The foot 15f can be coupled to the telescoping leg of the tube shown in FIG. 4B or a fixed length tube segment shown in FIG. 4A, for example.

Figure 5:
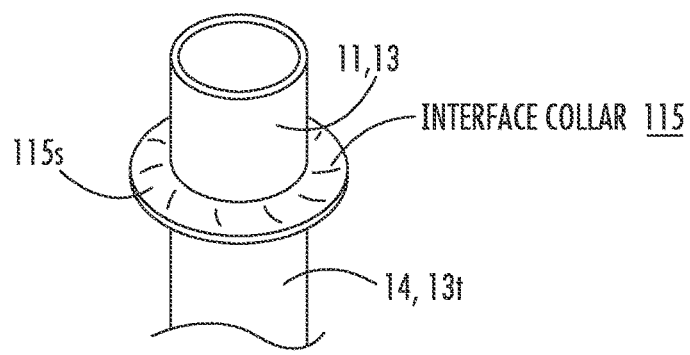
FIG. 5 is an enlarged partial top perspective view of an example tube and collar interface for a heat exchange reservoir according to embodiments of the present invention.
Figure 6:
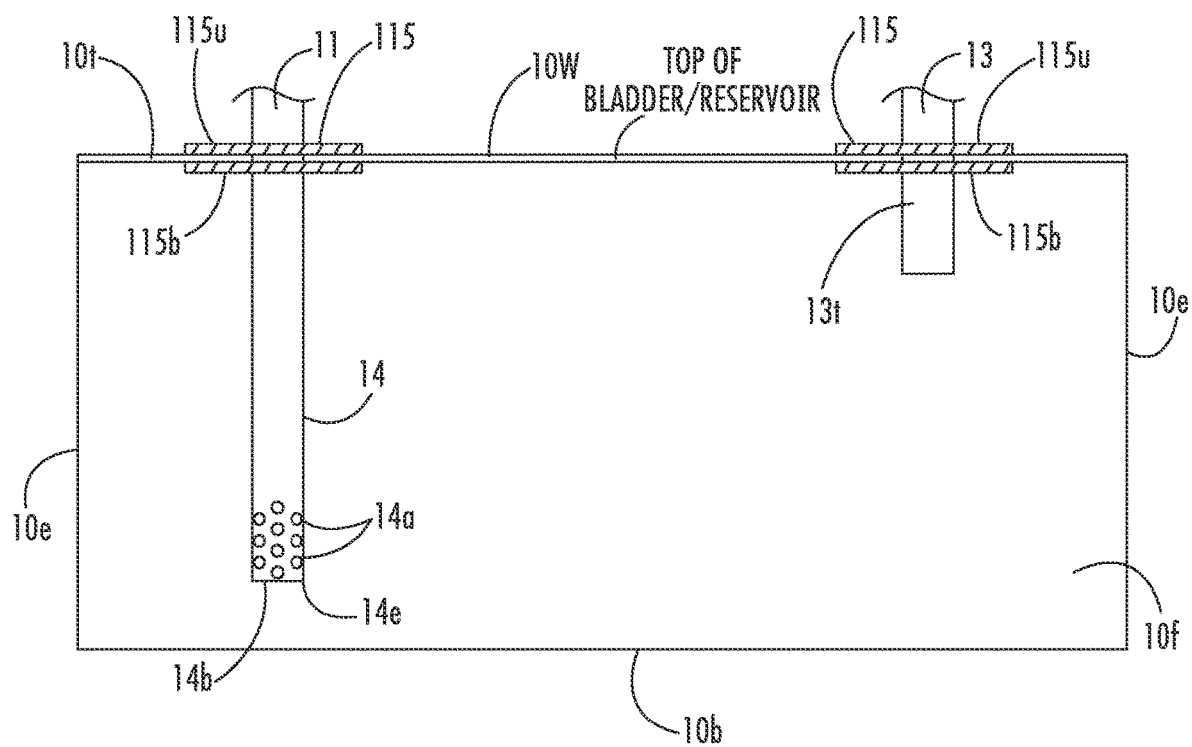
FIG. 6 is a front schematic partial section view of an example reservoir with tube and collar interfaces according to embodiments of the present invention.

Referring to FIGS. 5 and 6, the first and second ports 11, 13 can have tubes 14, 13t, respectively with upper end portions also comprising at least one collar 115 with a laterally (optionally radially) extending support surface 115s that can provide an attachment interface for the reservoir body 10body. If a single interface collar 115 is used, it can be placed inside or outside the target wall (i.e., top wall as shown in FIG. 6) for securing the tube to the wall in a fluid tight and leak resistant manner. As shown in FIG. 6, the attachment interface can comprise upper and lower collars 115, one inside and one outside the wall 10w that sandwich a wall thickness of the wall. The collar 115 can comprise a rigid polymer and may be integral to or attached to the outer wall of the tube 14, 13t.

FIG. 7 also illustrates that each of the ports 11, 13 can be provided at an upper end portion of an end wall 10e rather than the top 10t shown in FIGS. 1 and 2A.

FIGS. 3B and 9A illustrates an example of a winter weather flow arrangement of the reservoir 10. Because of the volume of the reservoir, the reservoir allows natural convection and/or conductive heating of the liquid (water) that enters in the first port 11 so that warm water exits the second port 13. FIG. 8 illustrates an example of a summer weather flow arrangement.

FIGS. 9A-9C also illustrates an example of a substantially rigid support member 100 that can be arranged about an exterior portion of the reservoir 10 to help support the reservoir body 10body. The support member 100 can have a length sufficient to extend above the trench hole; thus, it can have a length that is about 2-6 feet greater than the height of the reservoir 10. The support member 100 can include an aperture or slot 100a that allows a length of conduit 30 to extend therethrough. FIG. 9C illustrates a configuration of a support member 100 configured for attachment to the other end portion (not shown attached in FIG. 9A).

Although not shown, external or internal ribs or rigid or semi-rigid support members may be coupled to the reservoir body 10body. Other features are described in U.S. Pat. No. 9,284,952, the contents of which are hereby incorporated by reference as if recited in full herein.

Figure 10A:
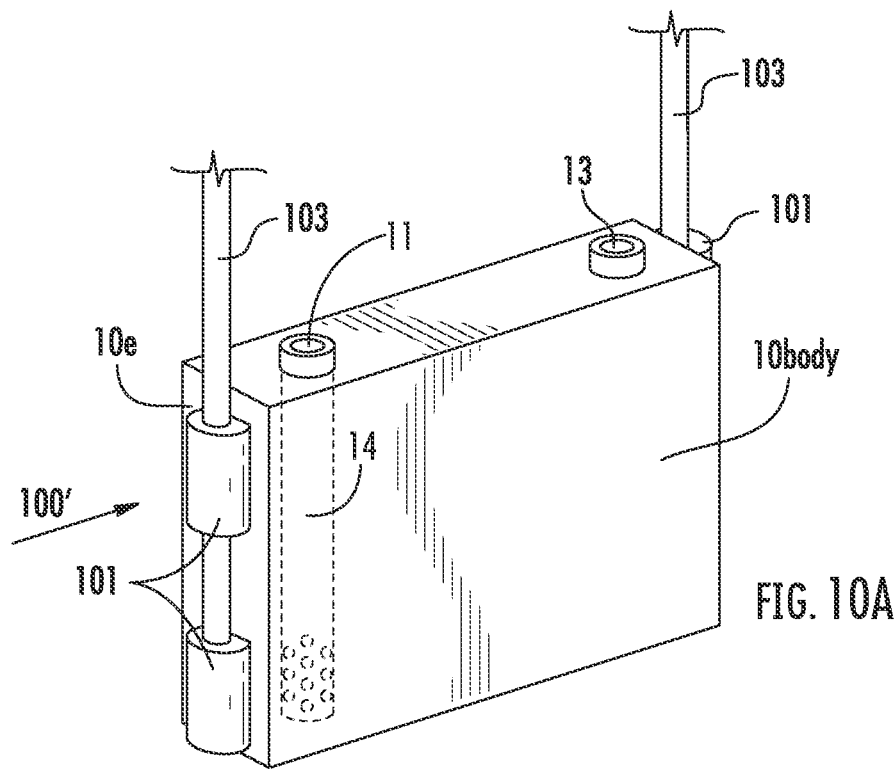
FIGS. 10A and 10B are side perspective views of the geothermal reservoir with other examples of external support members according to embodiments of the present invention.
Figure 10B:
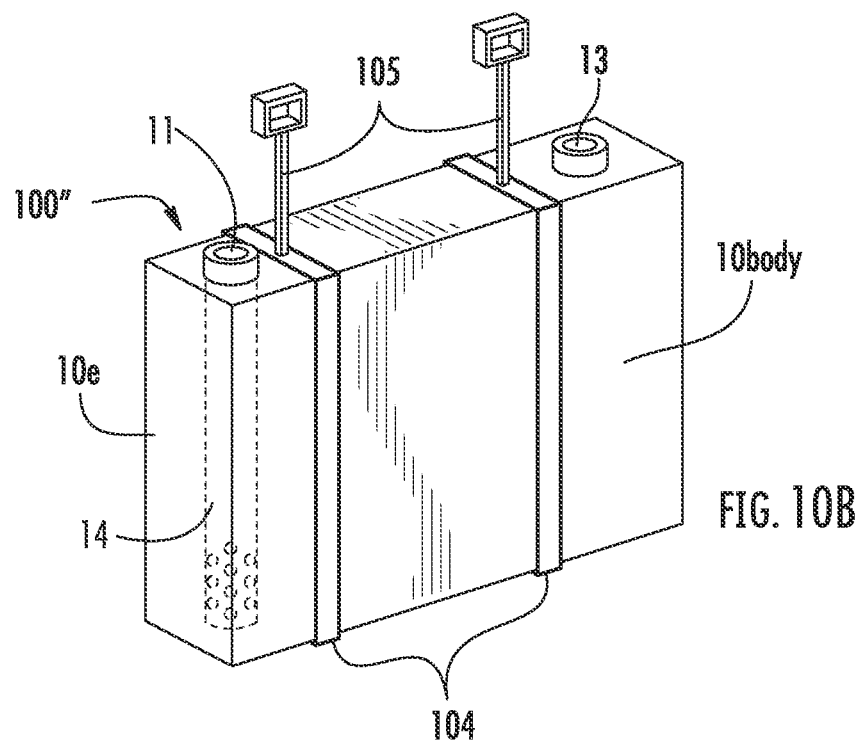
Figure 10D:
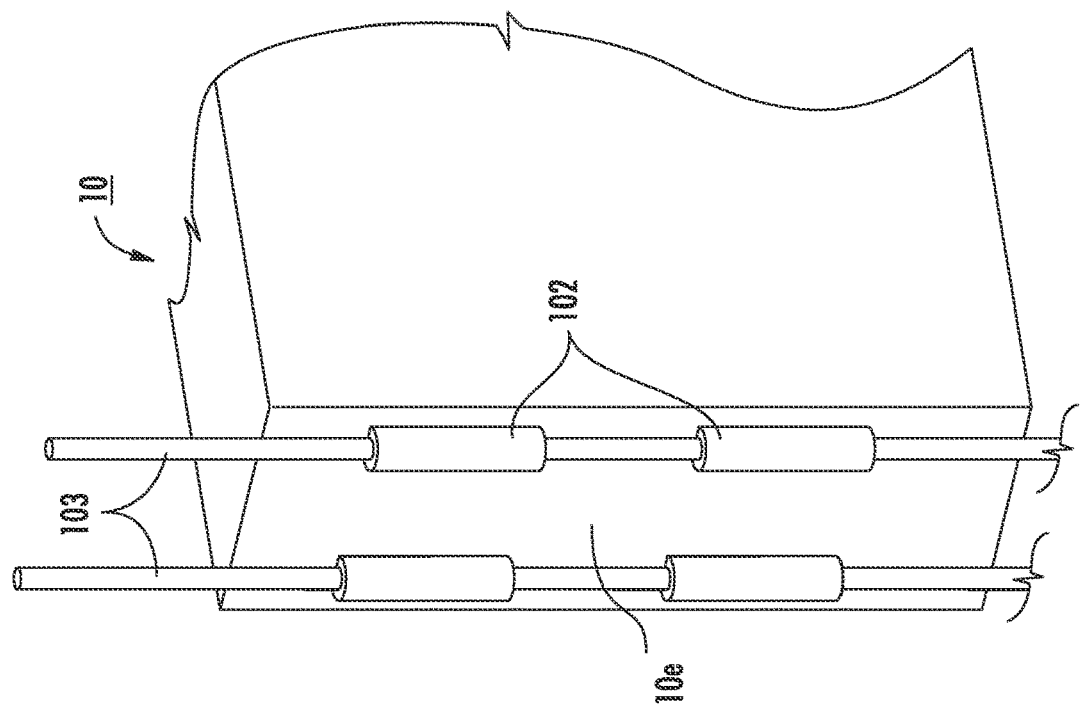
FIG. 10D is an enlarged partial end perspective view of the embodiment shown in FIG. 10C.
Figure 10C:
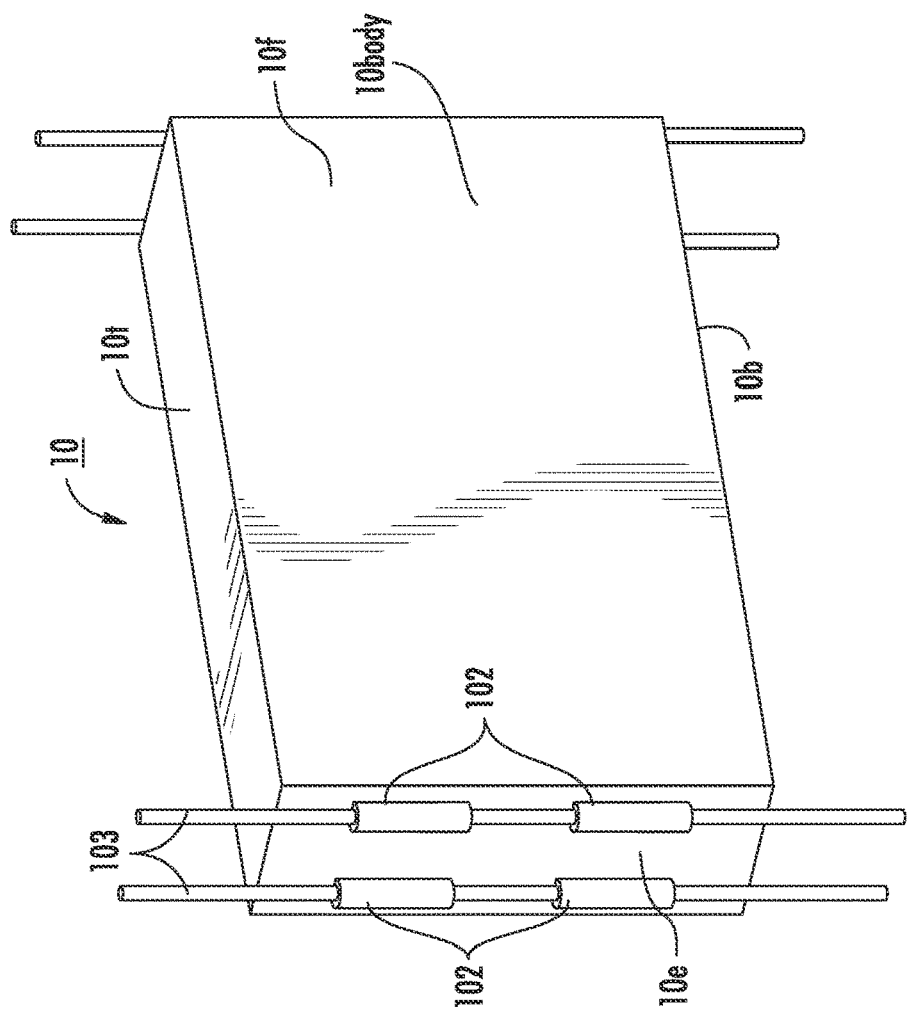
FIG. 10C is a side perspective view of a geothermal reservoir with yet another example of external support members according to embodiments of the present invention.

FIGS. 10A and 10B illustrate examples of alternate support members 100', 100". FIG. 10A shows the use of a plurality of aligned rings 101 that couple to an upstanding support rod or beam 103. FIG. 10B shows the use of external ribs 104 that may optionally couple to handles 105 for ease of installation. FIGS. 10C and 10D illustrate that the ends 10e of the reservoir 10 can include external long (typically fabric) loop channels 102 that snugly receive support members 103 (e.g., rods or bars). The loop channels 102 and support members 103 can cooperate to provide support to ends of the reservoirs 10 where the trench may be less straight potentially allowing for more expansion or "bowing" outward of the reservoir 10. Although shown as two sets of loop channels 102 on outer edges of the ends 10e, one or more than two sets may be used. Other external features that facilitate handling may also be used such as straps, handles and the like. These features may be integrated or releasably attached to the reservoir (or cover 110, FIG. 13, where used).

In some particular embodiments, a respective reservoir 10 can be configured to hold at least about 100 gallons of circulating liquid associated with the ground loop 40. The reservoir 10 can have a length of about 25 feet, a width of about 4-6 inches, and a height of about 2 feet. For example, the reservoir 10 an hold about 124 gallons for a 25 foot long×2 foot high×4 inch wide reservoir. A typical residential single family home may use a reservoir or reservoirs that have about 200-400 gallons capacity (for about a 2 ton heat system).

It is contemplated that a length of about 25 feet of reservoir(s) 10 will be equivalent to a 400-500 foot per ton of looped ¾ inch pipe. The reservoir 10 can have over 325 times the volume of water based on a 6 inch trench and about 217 times the water based on a 4 inch trench. Because the reservoir 10 substantially fills a respective trench 20, post-placement, during installation, the surface contact area per one foot of trench for a reservoir 10 can be many times greater than the looped pipe systems making the installation easy and practical (over 35 times greater for a 6 inch trench or 30 times greater for a 4 inch trench). The trench area or volume needed is reduced for the same BTU transfer, greatly reducing the installation cost over coiled pipe or deep bore systems.

Stated differently, the volume of water in a typical one ton system with ¾ inch pipe is about 400-500 foot of trench of a one-pipe system. Based on a 400 foot system, the volume of water is about 9.18 gallons. The entire heat exchange is less than about 3.1 minutes which is relatively short. On an equivalent one-tone flexible or semi-flexible reservoir using a 25 foot long trench-reservoir (4 inches wide), the volume of water is about 124.7 gallons and the entire water is exchanged in about 41.5 minutes. This is a much longer time for heat exchange and also is more efficient due to the greater heat exchange surface area of the reservoir 10. The surface area of the ¾ inch pipe is about 78.5 square feet while the reservoir is 118 square feet (about 1.5 times greater), while requiring only ⅟₁₆ of the trench system length.

In some embodiments, the reservoir 10 has substantially laminar liquid (water) flow. The geothermal loop 40 can be configured so that the reservoir 10 can have substantially an entire water exchange in about 30-90 minutes, typically about 35-45 minutes, from a time into one port 11 to exit from the other 13, so that liquid enters on a bottom portion adjacent or at one end and exits at a top portion adjacent or at the other end, and vice versa, depending on heating or cooling heat exchange (whether for winter or summer uses).

The first and second (inlet and outlet) ports 11, 13 can reside on opposing end portions of the reservoir 10. The ports 11, 13 can reside on the top 10$t$ and/or bottom 10$b$ of the reservoir 10. In other embodiments, the ports 11, 13 can reside on an upper portion of the front and/or rear sides 10$f$, 10$r$. The ports 11, 13 can comprise standardized pipe connectors or fittings 11$c$, 13$c$ that connect to the flow path pipes 30. The fittings 11$c$, 13$c$ can be installed at a field site or at an OEM (original equipment manufacturing) facility. The fittings 11$c$, 13$c$ can be ¾ inch pipe fittings and the flow path pipes 30 can also be ¾ inch pipes or conduit. Other size fittings and pipes 30 may also be employed, typically between about 0.5 inches to about 1 inch in diameter, but smaller or larger sizes may be appropriate for some uses.

As shown, for example, in FIG. 8, the ports 11, 13 can be configured with a respective internal pipe or conduit segment 13$t$, 14 that resides a distance inside the reservoir and can include with nozzles, diffusers, or elbows 17 and/or other components that facilitate cross flow at entry into the reservoir to promote heat transfer. FIG. 8 illustrates an external elbow 17 and FIG. 7 illustrates an internal elbow 17.

Although shown as a single inlet and a single exit port 11, 13, multiple inlet and/or exit ports may be used. The pipes or conduits from the multiple ports can combine in a "Y" interface pipe upstream or downstream (depending on flow direction) of the reservoir 10. Where multiple inlet or exit ports 11, 13 are used, one set can be configured about one end portion or at other positions along the body 10$b$ and the other set about the other opposing (long) end portion or at other positions along the body 10$b$ to promote through flow to move up and down over a length of the reservoir for increasing heat transfer.

As shown in FIG. 3B, in some embodiments, a geothermal loop 40 can include a plurality of reservoirs 10$_1$, 10$_2$, typically with one reservoir 10$_1$, 10$_2$ feeding the next. As indicated by the arrows for flow direction, FIG. 3B illustrates a cold weather arrangement where flow is in the first reservoir 10$_1$ at the port 11, flows through the first reservoir, exits the port 13 and flow then enters the second reservoir at the port 11 and exits at the port 13. The flow direction is reversed for summer or warm weather operation. When more than one reservoir 10 is used for a particular site or a particular geothermal loop 40, different sized and/or configured reservoirs 10 may be used.

In some embodiments, the reservoirs 10 can be configured as modular size reservoirs for ease in scaling for installations requiring different tonnage heating/cooling. Thus, each 25 foot section can be rated for a defined length per ton of heat transfer capacity (for a 2 inch or a four inch trench).

It is contemplated that a 2400 square foot residence, typically using a four ton heat system may use about 100 feet of reservoir 10 (which may be provided as four 25 foot long reservoirs 10).

To change the flow direction, a user can manually change the inlet and outlet flow conduits at the circulation pump which is typically on an exterior location of the building to change flow direction through the ground loop 40 and at least one reservoir 10 for winter or summer directions. In other embodiments, Valve(s), such as a reversible valve, can be used for automated flow control and (external, ambient) temperature sensors (e.g., thermocouples) may be used to automatically dictate flow direction. A processor or electronic controller can be in communication with the sensor(s) to automatically direct the valve operation and flow direction. The controller or processor can monitor temperature and change flow direction when it remains above a defined threshold for a defined time before flow direction is changed.

In some embodiments, temperature sensors may be provided to sense Temperature in and Temperature out of one or more reservoirs and pump rates can be adjusted accordingly.

Figure 13:
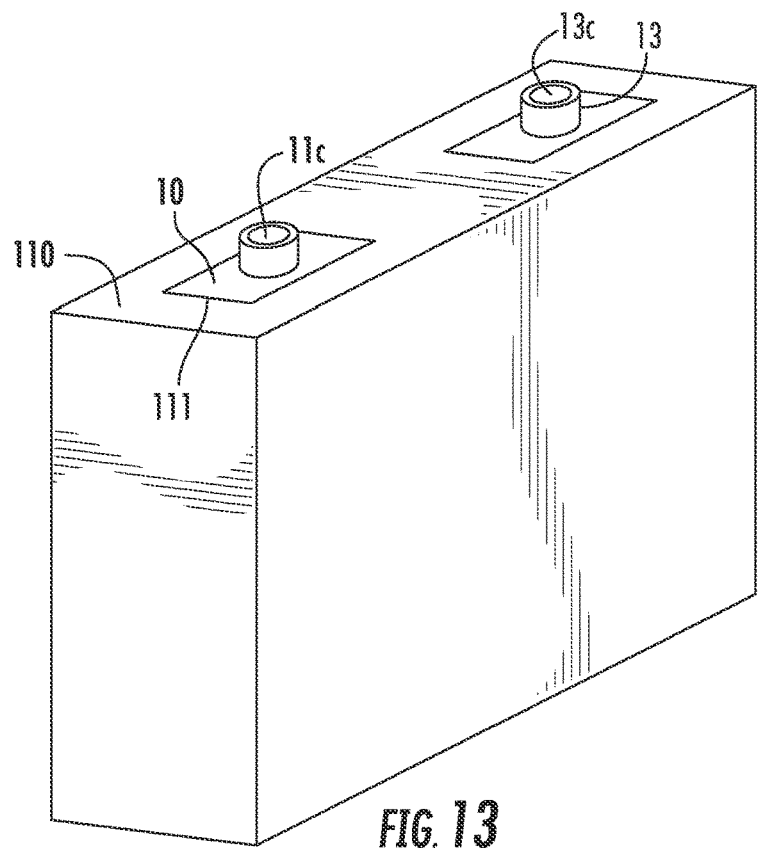
FIG. 13 is an end perspective view of a reservoir in a flexible outer cover according to embodiments of the present invention.

FIGS. 11A, 11B and 12A-12C illustrate additional embodiments of a reservoir 10. In these embodiments, the reservoir 10 can reside inside an external cover 110. As shown in FIG. 13, the cover 110 can have a shape and size that substantially corresponds to that of the reservoir 10. The cover 110 can totally or partially enclose the reservoir 10 to protect the reservoir 10 from rocks and other objects that might damage or puncture the reservoir 10.

The external cover 110 can comprise a thin flexible material having a thickness that is typically between about 10 mil to about 100 mil, such as between about 20 to 50 mil, including about 20 mil, about 25 milt, about 30 mil, about 40 mil, about 45 mil and about 50 mil. The material can be permeable, semi-permeable or impermeable to water.

The external cover 110 can be a different material than the reservoir 10. The cover 110 may have a denser material than the reservoir 10. The cover 110 and the reservoir 10 can each be formed of a material that provides a suitable thermal conductance to provide suitable geothermal heat exchange. One or more of each can have a coating or multi-layered material forming internal and/or external surfaces on the walls thereof to promote thermal conductance. Examples of suitable coatings or materials include, but are not limited to, non-reactive metals (at least where used as an internal layer or coating) such as aluminum foil, cellulose or paper based materials with glass fibers and other fillers, and other suitable material The external cover 110 can be reinforced with fibers, ribs, materials or other reinforcement or strengthening members or materials. The external cover 110 may be biodegradable over time.

As shown in FIGS. 12A-12C, the reservoir 10 can reside inside the external cover 110 and may be held loose therein prior to filling. The cover 110 can expand to conform to a trench as the reservoir 10 is filled with water. The cover 110 and the reservoir 10 can be conformable to water pressure so as to expand outwardly in response to filling.

As shown in FIG. 12A, the reservoir 10 expands during filling while inside the cover 110. As the reservoir 10 expands, it pushes outward against the cover 110 thereby expanding the cover 110 (FIG. 12C) causing both the cover 110 and reservoir 10 to conform to and abut a trench wall.

In other embodiments, the cover 110 can be attached over at least a major portion of a surface area of the reservoir, e.g., laminated to the reservoir 10 so that each is concurrently responsive to expand outward in response to filling with water.

The reservoir 10 can be attached to the cover 110 at one or more locations via adhesive, VELCRO, sewn attachments, or other attachment configurations. The cover 110 and the reservoir 10 can each be held via one or more collars about one or both ports 11, 13. The cover 110 can include apertures, slots, ports or open regions 111 (FIG. 13) that allow the plumbing connections to the reservoir 10.

The external components and features described above (e.g., FIGS. 7A-7D) with respect to the reservoir 10 can be provided on the cover 110 to facilitate handling and installation. FIG. 13 illustrates the use of at least one top strap on the cover 110. However, other externally accessible features or members can be used.

FIG. 11A shows that the cover 110 may be configured to expose the end walls 10e of the reservoir 10 and each may include handling features, such as loops $10_1$ that can attach to a rod 103. FIG. 11B shows that the cover 110 can substantially encase the reservoir 10.

Figure 14:
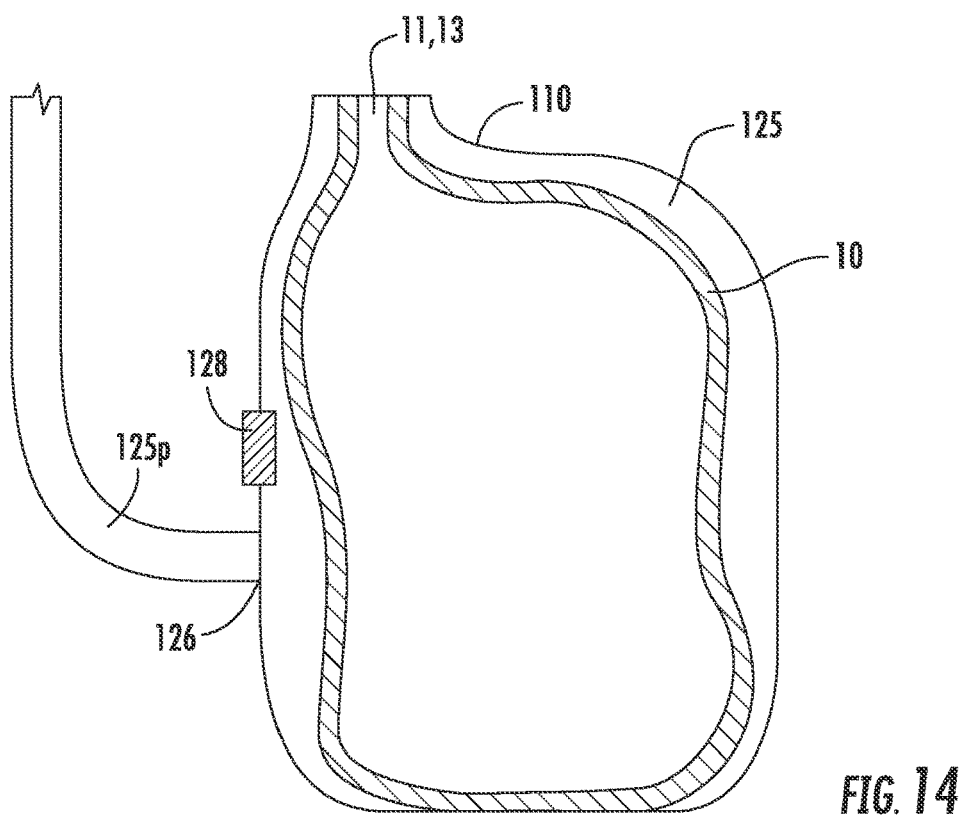
FIG. 14 is an end section view of yet another embodiment of the invention illustrating a fluid cavity between the cover and reservoir according to some embodiments of the present invention.

As shown in FIG. 14, in some embodiments, water, gas or other fluid may be introduced into an interior cavity 125 formed between the cover 110 and reservoir 10 to promote thermal conductivity. The wall(s) of the flexible cover can expand outward as the reservoir is filled and/or as the interior cavity is filled as the interior cavity 125 resides between the outer wall of the reservoir and the inner wall of the cover. The cavity 125 may be configured to circulate or discharge fluid or hold fluid captured, once filled. If the fluid leaches from the interior cavity 125, a refill port 126 with and associated plumbing 125p may be used to re-fill the cavity 125 (manually or automatically). For automated configurations, one or more pressure sensors 128 in the cavity 125 can be externally monitored and used to facilitate the refill at suitable times and amounts.

Figure 17:
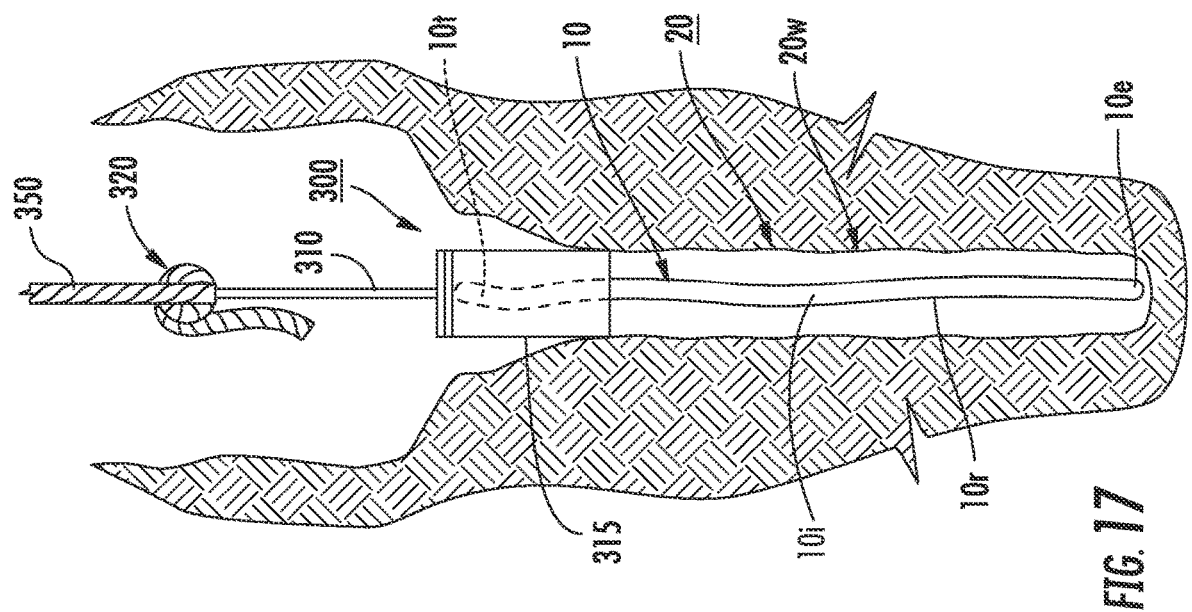
FIG. 17 is an end view of the jig shown in FIG. 15 attached to a reservoir (unfilled) in a trench according to embodiments of the present invention.
Figure 15:
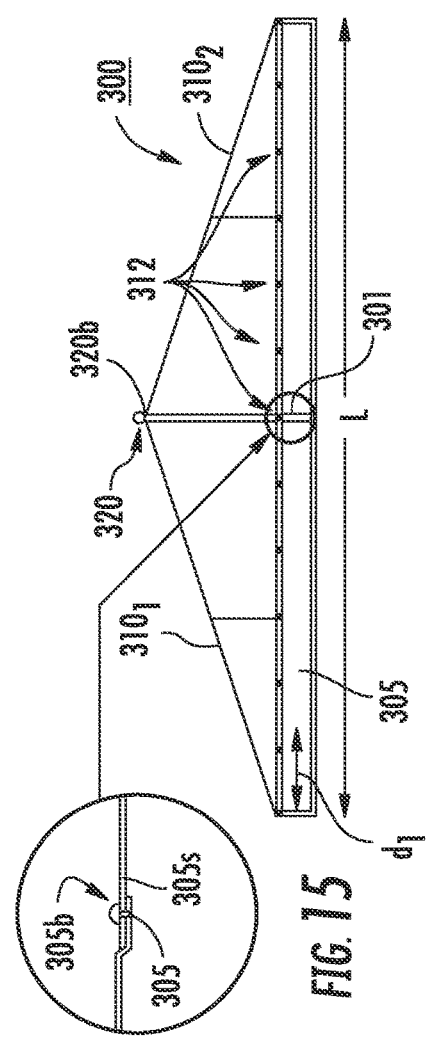
FIG. 15 is a front view of a jig suitable for installing a reservoir into a trench according to embodiments of the present invention.
Figure 16:
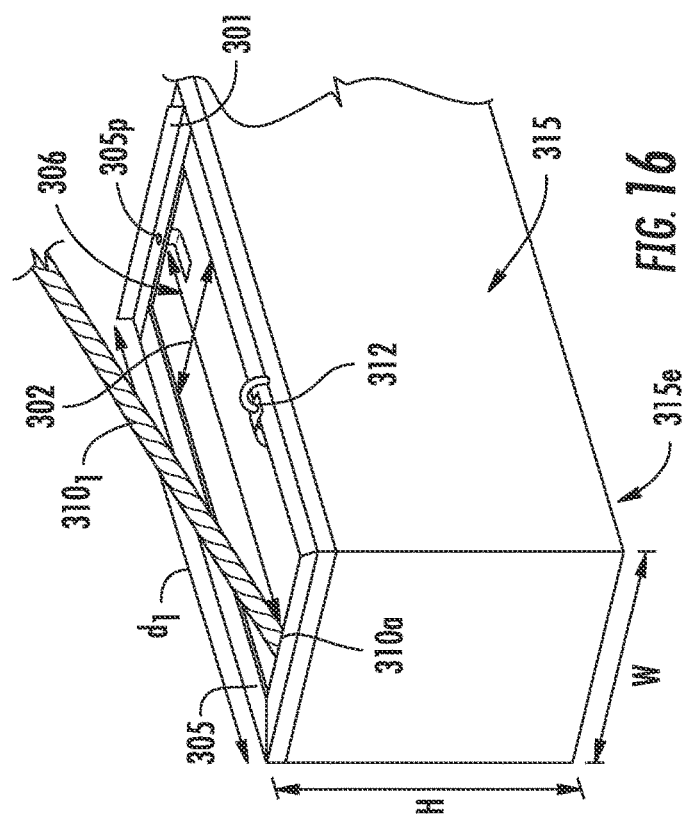
FIG. 16 is a front end perspective view of the jig shown in FIG. 15 attached to a reservoir body according to embodiments of the present invention.

As shown in FIGS. 15-17, a jig 300 can be used to lower the reservoir 10 into the (pre-formed/prepared) trench 20. The jig 300 can be configured to hold the reservoir 10 at a plurality of spaced apart upper attachment zones 312, typically at zones, regions or points that are (symmetrically or asymmetrically) spaced apart from each other a distance "d1" which can be about 1-3 feet, typically about 2 feet (24"), apart. The attachment zones 312 can be along a perimeter and/or along a center line between the two long sides of the frame via cross members 301 that attach to the upper rigid rectangular frame 305. So, for example, the jig 300 can be attached to about 12 points on a 25 ft long reservoir or cell 10. The top of the jig 300t can have an open center gap spaces 302 between cross structures or cross members 301.

In some embodiments, the jig 300 is provided in two releasably attachable segments with the cross-member 310 providing the interface therebetween.

The enlarged view of the detail of FIG. 15 illustrates an exemplary attachment zone 305p using the cross-member 301 showing that one or more carriage bolts 305b can be used to allow the jig to be transported in two or more sections due to the length of the jig. The carriage bolt(s) 305b can be used due to smooth inside of the jig's sides 315. The carriage bolt has the smooth top that can rest on the side of the cell for installation. In other embodiments, the jig 300 can be provided as a single piece unit (relatively long, e.g., about 25 feet) that may be challenging for use with small equipment. In the embodiment show, the jig 300 is a two piece system, but the jig 300 can also be provided as three or more cooperating pieces that can be assembled onsite or otherwise.

As shown in FIGS. 16 and 17, the upper frame 305 can hold downwardly sidewalls 315 that have sufficient rigidity to maintain their shape and that have increased rigidity over the unfilled reservoir 10 (and external liner 110, where used).

The sidewalls 315 can be on all four sides or on a subset of the sides of the frame 305 and each can extend down the same or different lengths. As shown, the sidewalls 315 define a rectangular enclosure 305e that encloses a reservoir top 10t. The sidewalls 315 can extend down on all four sides, all of the way around the upper perimeter frame 305, to define the enclosure space 305e. The sidewalls 315 can extend down a distance "H" that is between about 1-3 feet, typically about 18 inches. The sidewalls 315 can be formed of sheet metal that attaches to angle iron or formed rigid metal bars of the frame 305. For example, 18 to 10 gauge sheet metal can be used for the sidewalls 315.

As shown in FIG. 17, the reservoir 10 can be suspended to hang below the jig 300 and only an upper portion (e.g., 1-2 feet, such as about 18") of the reservoir 10 is inside the enclosure of the jig's sheet metal 315. The jig 300 can have a length corresponding to the length of the reservoir 10 being installed.

FIG. 15 is a side view of the jig 300 without the reservoir 10 or sidewalls 315 attached. FIG. 15 shows that ropes, chords, wires, cables or other support members $310_1$, $310_2$ can be attached to each end portion of the frame 305 and, when attached to a center lift point 320 at inner adjacent end portion of the members $310_1$, $310_2$, define an A frame. A lift bolt 320b or other attachment means can attach to the lift point to hoist the assembly into the trench 20 (FIG. 17). The jig 300 can be lifted from the center point 320 of the A frame. However, it is contemplated that the jig can be lifted via both ends or at other locations and the A frame is not required.

FIG. 16 shows the end of the jig and the attachment of the end 310a of the A frame. This figure also shows the width of the jig 300 is the trench width (such as, for example, about 6"). The jig 300 holds the reservoir 10 at spaced apart points 305p (e.g., about every 2 feet) along the top of the cell. The jig hooks 306 that hold the reservoir 10 are shown in FIG. 16.

FIG. 17 is an end view of the cell lowered in the trench and holding the cell. At this position, the cell is filled with water. After being filled with water, the earth in the trench 20 is refilled around the top of the jig 300 via spaces 302 to allow good conformation of the reservoir at the top.

In digging the trench, the top of the trench 20 can be wide and may allow the reservoir 10 to balloon at the top. In order to inhibit or stop this response, the earth can be filled in to the top of the jig 300. Once the cell or reservoir 10 is filled with liquid and the earth has been filled around the jig 300, the hooks 306 can be released from the jig 300 and the jig 300 can be removed from the trench (or it may remain in position or in the trench above the reservoir).

In some embodiments, the jig 300 can also be configured to hold a liner 110 if installed with the reservoir 10, such as using liner attachment members 312 shown in FIG. 16.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, if used, are intended to cover the structures described herein as performing the recited function and not only structural equivalents but also equivalent structures. Therefore, it is to be understood that the foregoing is illustrative of the present invention and is not to be construed as limited to the specific embodiments dis- That which is claimed is:

1. A method of installing a geothermal heat transfer system, comprising:
placing a geothermal heat exchange reservoir in a horizontal trench having a floor and upwardly extending trench sidewalls, wherein the geothermal heat exchange reservoir comprises a flexible reservoir body having width, height, and length dimensions, wherein the flexible reservoir body has a top, a bottom, a pair of long sides and a pair of opposing end walls, wherein the flexible reservoir body comprises first and second fluid ports that are spaced apart along the length dimension and that are positioned on opposing sides of a center of the length dimension, wherein the first and second fluid ports both reside on an upper portion of the flexible reservoir body, wherein the first fluid port comprises an elongate internal tube having a length sufficient to place a bottom of the elongate internal tube abutting the bottom or adjacent the bottom of the flexible reservoir body, wherein the elongate internal tube has a plurality of through apertures on a lower portion thereof, and wherein the second fluid port comprises an internal tube that is shorter than the elongate internal tube and has a length that is less than half the height dimension of the flexible reservoir body; and
filling the geothermal heat exchange reservoir with liquid causing the flexible reservoir body to expand to snugly contact and conform to the trench sidewalls,
wherein the geothermal heat exchange reservoir is configured to flow liquid from a pump associated with a heat exchanger or water-cooled condenser in a closed geothermal loop comprising the flexible reservoir body in a first flow direction during summer and in an opposing second flow direction during winter whereby the liquid flows out of the through apertures of the elongate internal tube in the first flow direction and into the through apertures of the elongate internal tube in the second flow direction, and
wherein the length of the internal tube connected to the second fluid port is in a range of about 0.25 inches to about 3 inches, and wherein the internal tube connected to the second fluid port resides a distance in a range of about 4-8 inches from a first of the opposing end walls and the elongate internal tube resides a distance in a range of about 4-8 inches from a second of the opposing end walls of the flexible reservoir body.

2. The method of claim 1, wherein the flexible reservoir body is rectangular and the length dimension in a range of about 10-100 feet and the width dimension in a range of about 2-4 inches.

3. The method of claim 1, wherein the placing is carried out to place the flexible reservoir body in a compacted virgin earth trench providing the trench sidewalls, and wherein the filling is carried out to cause the bottom and long sides of the flexible reservoir body forming front and rear walls to snugly contact and conform to the compacted virgin earth trench defining a respective trench bottom as well as the trench sidewalls to facilitate heat transfer.

4. The method of claim 1, wherein the elongate internal tube has a telescoping configuration whereby the elongate internal tube has a first length that telescopingly extends to a longer second length inside the flexible reservoir body to place the bottom of the elongate internal tube to abut or reside adjacent the bottom of the flexible reservoir body.

5. The method of claim 1, wherein the geothermal heat exchange reservoir is a first geothermal heat exchange reservoir, the method further comprising:
placing a second geothermal heat exchange reservoir in a different horizontal trench having a floor and upwardly extending trench sidewalls, wherein the second geothermal heat exchange reservoir comprises a second flexible reservoir body having width, height, and length dimensions, wherein the second flexible reservoir body has a top, a bottom, a pair of long sides and a pair of opposing end walls, wherein the second flexible reservoir body comprises first and second fluid ports that are spaced apart along the length dimension, wherein the first and second fluid ports both reside on an upper portion of the second flexible reservoir body, wherein the first fluid port comprises an elongate internal tube having a length sufficient to place a bottom of the elongate internal tube in abutting contact with or adjacent the bottom of the second flexible reservoir body, and wherein the elongate internal tube has a plurality of through apertures on a lower portion thereof;
filling the second geothermal heat exchange reservoir with liquid causing the second geothermal heat exchange reservoir to expand to snugly contact and conform to the trench sidewalls; and
connecting a closed loop flow path from the first and second geothermal heat exchange reservoirs to a heat pump or water-cooled condenser.

6. A method of installing a geothermal heat transfer system, comprising:
placing a geothermal heat exchange reservoir in a horizontal trench having a floor and upwardly extending trench sidewalls, wherein the geothermal heat exchange reservoir comprises a flexible reservoir body having width, height, and length dimensions, wherein the flexible reservoir body has a top, a bottom, a pair of long sides and a pair of opposing end walls, wherein the flexible reservoir body comprises first and second fluid ports that are spaced apart along the length dimension and that are positioned on opposing sides of a center of the length dimension, wherein the first and second fluid ports both reside on an upper portion of the flexible reservoir body, wherein the first fluid port comprises an elongate internal tube having a length sufficient to place a bottom of the elongate internal tube abutting the bottom or adjacent the bottom of the flexible reservoir body, wherein the elongate internal tube has a plurality of through apertures on a lower portion thereof, and wherein the second fluid port comprises an internal tube that is shorter than the elongate internal tube and has a length that is less than half the height dimension of the flexible reservoir body; and
filling the geothermal heat exchange reservoir with liquid causing the flexible reservoir body to expand to snugly contact and conform to the trench sidewalls,
wherein the geothermal heat exchange reservoir is configured to flow liquid from a pump associated with a heat exchanger or water-cooled condenser in a closed geothermal loop comprising the flexible reservoir body in a first flow direction during summer and in an opposing second flow direction during winter whereby the liquid flows out of the through apertures of the elongate internal tube in the first flow direction and into the through apertures of the elongate internal tube in the second flow direction, wherein the elongate internal tube comprises a plate at the bottom that has a greater lateral extent than the elongate internal tube.

7. The method of claim 6, wherein the plate is defined by or coupled to an end cap that has a closed vertically extending wall that is devoid of through apertures, and wherein the plate abuts the bottom of the flexible reservoir body.

8. The method of claim 1, wherein the plurality of through apertures reside only along a sub-length of the elongate internal tube and within a distance of about 6 inches from the bottom of the flexible reservoir body.

9. A method of geothermal heat transfer, comprising:
flowing liquid from a pump associated with a heat exchanger or water-cooled condenser in a closed geothermal loop in a first flow direction during summer and in an opposing second flow direction during winter while a flexible reservoir body resides in a horizontal trench a distance below ground surface with primary rear and front walls that snugly contact and conform to a trench wall shape thereat,
wherein the flexible reservoir body has a top, a bottom, opposing front and rear walls and opposing end walls spaced apart in a length direction, wherein the flexible reservoir body comprises a width that is in a range of about 1-12 inches, a height in a range of 1-4 feet and a length in the length direction that is in a range of about 10-100 feet, wherein the flexible reservoir body comprises first and second ports spaced apart in the length direction and positioned in the top, and wherein the first port comprises an elongate internal tube having a closed bottom residing in abutting contact with or adjacent a bottom of the bottom of the flexible reservoir body and a plurality of apertures in a lower portion of the elongate internal tube, wherein the second port comprises an internal tube that has a length that is less than half the height of the flexible reservoir body,
wherein the flowing the liquid comprises flowing liquid into or out of the apertures of the elongate internal tube depending on whether liquid is flowing in the first flow direction or the second flow direction, and
wherein the length of the internal tube connected to the second port is in a range of about 0.25 inches to about 3 inches, and wherein the internal tube connected to the second resides a distance in a range of about 4-8 inches from a first of the opposing end walls and the elongate internal tube resides a distance in a range of about 4-8 inches from a second of the opposing end walls of the flexible reservoir body.

10. The method of claim 9, wherein the elongate internal tube has a telescoping configuration whereby the elongate internal tube has a first length that telescopingly extends to a longer second length inside the flexible reservoir body to place the bottom of the elongate internal tube to abut or reside adjacent the bottom of the flexible reservoir body.

11. The method of claim 9, wherein the elongate internal tube comprises a plate at the bottom that has a greater lateral extent than the elongate internal tube.

12. The method of claim 11, wherein the plate is defined by or coupled to an end cap that has a closed vertically extending wall that is devoid of through apertures, and wherein the plate abuts the bottom of the flexible reservoir body.

13. The method of claim 9, wherein the plurality of apertures reside only along a sub-length of the elongate internal tube and within a distance of about 6 inches from the bottom of the flexible reservoir body.

14. The method of claim 8, wherein the elongate internal tube has a straight linear configuration to terminate at a closed bottom end, and wherein the elongate internal tube extends in a vertical orientation in the flexible reservoir body.

15. The method of claim 9, wherein the elongate internal tube has a straight linear configuration to terminate at the closed bottom, wherein the elongate internal tube extends in a vertical orientation in the flexible reservoir body, and wherein the apertures reside only within 6 inches or less from the closed bottom.

16. The method of claim 9, wherein the flowing the liquid in the first flow direction and the second flow direction has laminar liquid flow, and wherein the flowing in the first flow direction and the second flow direction is in a geothermal loop configured so that the flexible reservoir body exchanges an entire liquid content in about 30-90 minutes from a time into one of the first and second ports to exit from the other of the first and second ports.

17. A method of geothermal heat transfer, comprising:
flowing liquid from a pump associated with a heat exchanger or water-cooled condenser in a closed geothermal loop in a first flow direction during summer and in an opposing second flow direction during winter, wherein, in one of the first or second flow directions, liquid flows into a first port of a flexible reservoir body that resides in a horizontal trench a distance below ground surface with primary rear and front walls that snugly contact and conform to a trench wall shape thereat, then out of a spaced apart second port,
wherein the flexible reservoir body has a top, a bottom, opposing front and rear walls and opposing end walls spaced apart in a length direction, and wherein the first comprises an elongate internal tube having a closed bottom residing in abutting contact with or adjacent the bottom of the flexible reservoir body and a plurality of apertures in a lower portion of the elongate internal tube, wherein the flexible reservoir body comprises a width that is in a range of about 1-12 inches, a height in a range of 1-4 feet and a length in a range of about 10-100 feet, and
wherein the flowing the liquid comprises flowing liquid into or out of the apertures of the elongate internal tube depending on whether liquid is flowing in the first flow direction or the second flow direction,
wherein the second port is connected to an internal tube with a length that is in a range of about 0.25 inches to about 3 inches, wherein the internal tube connected to the second port is shorter than the elongate internal tube, and wherein the elongate internal tube and the internal tube connected to the second port reside a distance in a range of about 4-8 inches from a respective end wall of the flexible reservoir body.

18. The method of claim 1, wherein the elongate internal tube is configured to press against the bottom of the flexible reservoir body.

19. The method of claim 9, wherein the elongate internal tube is configured to press against the bottom of the flexible reservoir body.

* * * * *